(12) United States Patent
Akiyoshi et al.

(10) Patent No.: US 7,212,572 B2
(45) Date of Patent: May 1, 2007

(54) IMAGE CODING METHOD AND APPARATUS AND IMAGE DECODING METHOD AND APPARATUS

(75) Inventors: Kozo Akiyoshi, Tokyo (JP); Nobuo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 680 days.

(21) Appl. No.: 10/200,157

(22) Filed: Jul. 23, 2002

(65) Prior Publication Data

US 2003/0068090 A1 Apr. 10, 2003

(30) Foreign Application Priority Data

Jul. 26, 2001 (JP) ............... 2001-225512

(51) Int. Cl.
*H04N 7/12* (2006.01)
*H04B 1/66* (2006.01)

(52) U.S. Cl. .................. 375/240.11
(58) Field of Classification Search ............ None
See application file for complete search history.

(56) References Cited

U.S. PATENT DOCUMENTS

| | | | | |
|---|---|---|---|---|
| 5,282,255 A | * | 1/1994 | Bovik et al. ............. | 382/239 |
| 5,657,402 A | * | 8/1997 | Bender et al. ............ | 382/284 |
| 5,692,073 A | * | 11/1997 | Cass ................... | 382/219 |
| 6,018,592 A | | 1/2000 | Shinagawa et al. | |
| 6,137,910 A | | 10/2000 | Shinagawa et al. | |
| 6,385,249 B1 | * | 5/2002 | Kondo et al. ........ | 375/240.27 |
| 6,650,779 B2 | * | 11/2003 | Vachtesvanos et al. .... | 382/228 |
| 2001/0019335 A1 | * | 9/2001 | Takeo ................ | 345/670 |
| 2002/0089549 A1 | * | 7/2002 | Munro et al. ........... | 345/835 |

FOREIGN PATENT DOCUMENTS

EP 0539833 A 5/1993

OTHER PUBLICATIONS

European Patent Office, European Search Report, Nov. 7, 2002, EP02015403.5.
Tudor P N: "Tutorial MPEG-2 video compression" Electronics and Communication Engineering Journal Institution of Electrical Engineers, London, GB, vol. 7, No. 6, 1, Dec. 1995, pp. 257-264.
Song X et al: "A hierarchical motion estimation algorithm using nonlinear pyramid for MPEG-2" Circuits and Systems, 1997.

(Continued)

*Primary Examiner*—Nhon Diep

(57) ABSTRACT

An image processing method and apparatus for encoding and decoding image data in which the coding and decoding method may be simplified based on factors such as processing speed requirements. In encoding, an image input unit receives a first image and a second image (key frames). A matching processor begins performing a multiresolutional analysis using pixel-by-pixel matching between the images but, due to predetermined factors or settings, either discontinues the analysis or switches to a simplified method of analysis prior to the final resolution level. If the analysis is discontinued during encoding (i.e. at the encoding side), the analysis may be completed at the decoding side prior to conducting the decoding and the decoding side may be arranged accordingly.

11 Claims, 19 Drawing Sheets

I1

I2

OTHER PUBLICATIONS

ISCAS '97., Proceedings of 1997 IEEE International Symposium on Hong Kong Jun. 9-12, 1997, New York, NY, USA, IEEE, US, Jun. 9, 1997, pp. 1165-1188.

Accame M et al: "High Performance Hierarchical Block-based Motion Estimation for Real-Time Video Coding" Real-Time Imaging, Academic Press Limited, GB, vol. 4, No. 1, Feb. 1, 1998, pp. 67-79.

Newcglowski J et al: "Motion Compensated Video Sequence Interpolation Using Digital Image Warping" Proceedings of the International Conference on Acoustics, Speech and Signal Processing (ICASSP). I. Image and Multidimensional Signal processing. Adelaide, Apr. 19-21, 1994, New York, IEEE, US, vol. 5 Conf. 19, Apr. 19, 1994, pp. V-205-V-208.

* cited by examiner

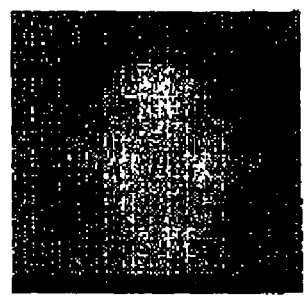 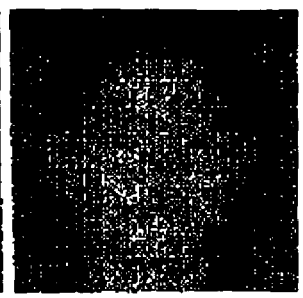
Fig.1a  Fig.1b
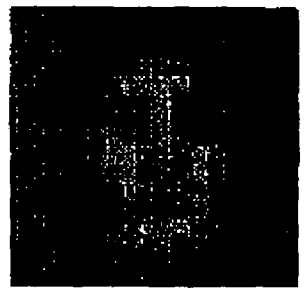 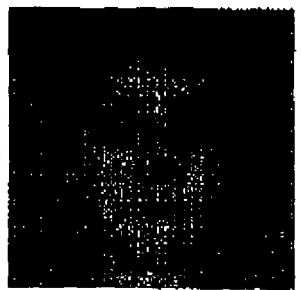
Fig.1c  Fig.1d
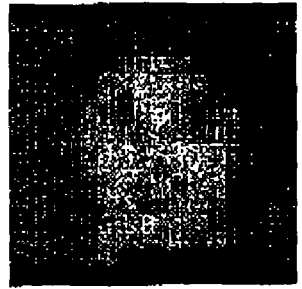 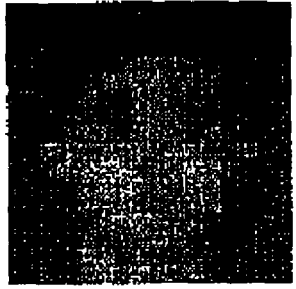
Fig.1e  Fig.1f
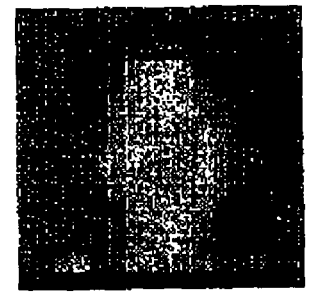 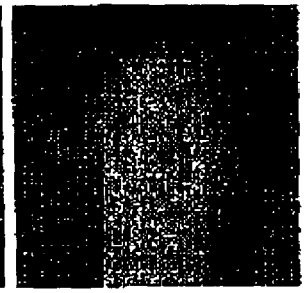
Fig.1g  Fig.1h
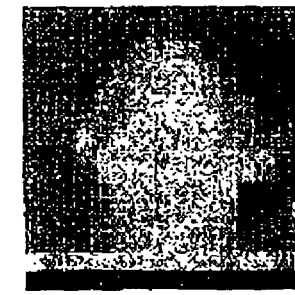 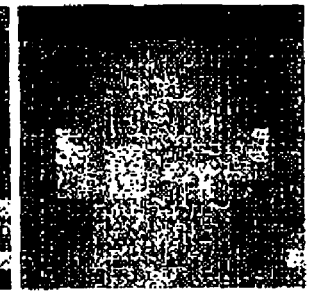
Fig.1i  Fig.1j

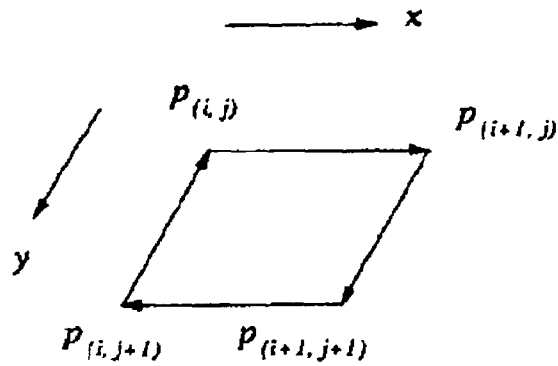
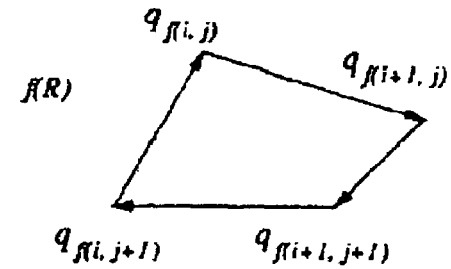
Fig.2A
Fig.2R
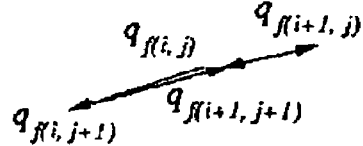
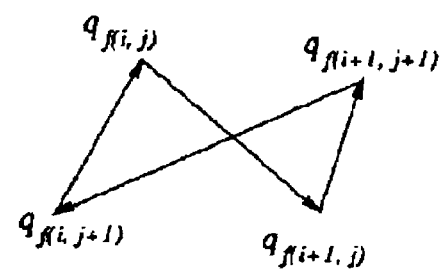
Fig.2E
Fig.2B
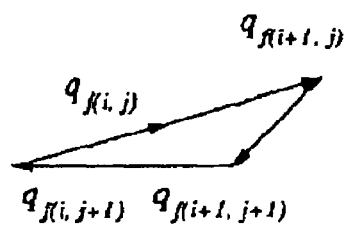
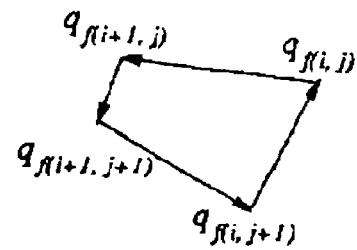
Fig.2D
Fig.2C

Fig. 9

IMAGE CODING METHOD AND APPARATUS AND IMAGE DECODING METHOD AND APPARATUS

BACKGROUND OF THE INVENTION

1. Field of the Invention

The present invention relates to an image processing technology, and more particularly, relates to coding and decoding techniques in which images are interpolated based on a matching technology.

2. Description of the Related Art

Recently, image processing and compression methods such as those proposed by MPEG (Motion Picture Expert Group) have expanded to be used with transmission media such as network and broadcast rather than just storage media such as CDs. Generally speaking, the success of the digitization of broadcast materials has been caused at least in part by the availability of MPEG compression coding technology. In this way, a barrier that previously existed between broadcast and other types of communication has begun to disappear, leading to a diversification of service-providing businesses. Thus, we are facing a situation where it is hard to predict how digital culture will evolve in this age of broadband.

Even in such a chaotic situation, it is clear that the direction of the compression technology of motion pictures will be to move to both higher compression rates and better image quality. It is well-known that block distortion in MPEG compression is sometimes responsible for causing degraded image quality and preventing the compression rate from being improved.

SUMMARY OF THE INVENTION

The present invention has been made in view of the foregoing circumstances and an intention thereof is to provide a coding and decoding technology that provides fast and efficient coding and compression. Another intention is to provide a coding and decoding technology suitable for the somewhat conflicting demands of maintaining image quality and improving compression.

The embodiments of the present invention generally relate to an image processing technology. This technology may utilize the image matching technology (hereinafter referred to and described as the "base technology") which has been proposed in Japanese patent No.2927350, and U.S. Pat. Nos. 6,018,592 and 6,137,910, assigned to the same assignee, which are hereby incorporated by reference.

A preferred embodiment according to the present invention relates to an image coding method. This method includes: preparing a multiresolutional image hierarchy; conducting analysis on the multiresolutional image hierarchy; and switching the analysis to a simplified method at a stage prior to a final stage.

Multiresolution analysis is a process in which, after an image is transformed to a plurality of images with differing, generally hierarchical, resolutions, the image is analyzed over those resolutions. In general, the analysis proceeds from a lower or coarser resolution to a higher or finer resolution. In the following, such an example is used when necessary, however, the present embodiments are not limited to that effect.

Another preferred embodiment according to the present invention relates also to an image coding method. This method includes: generating corresponding point data by analyzing a first image and a second image in a multiresolutional manner; and outputting the corresponding point data generated by the generating, wherein the generating is such that the analyzing is switched to a simplified method at a stage prior to reaching a final resolution of the first and second images.

In a particular case, the generating may be such that pixel-by-pixel matching computation is performed based on correspondence between critical points detected through a two-dimensional search on the first image and those detected through a two-dimensional search on the second image. Moreover, the generating may be such that, after the first and second images are multiresolutionalized by respectively extracting the critical points, pixel-by-pixel matching computation is performed on the first and second images, at each resolution level, and pixel-by-pixel correspondence relations are acquired gradually at finer levels of resolution while inheriting a result of the pixel-by-pixel matching computation at a different resolution level.

In another particular case, the simplified method may include projecting corresponding point data of the first and second images at non-final resolution onto the first and second images at final resolution.

In another particular case, the switch to the simplified method may be made such that the simplified method is executed at a decoding side rather than at the decoding side. In this case, the analyzing will be discontinued at the decoding side and corresponding point data that have been generated up to the time the analyzing is discontinued may be output from the decoding side.

It will be understood that the first and second images (key frames) may also be intra-frame compressed and output together with the corresponding point data.

Still another preferred embodiment according to the present invention relates to an image decoding method. This method, which decodes data that has been coded by analyzing images in a multiresolutinal manner, is characterized in that, in a case when the analyzing has been discontinued at prior to reaching a final resolution stage, analyzing for remaining resolution stages is conducted at a decoding side by switching to a simplified method. Thereafter, the coded data may be decoded by a predetermined method.

Still another preferred embodiment according to the present invention relates also to an image decoding method. This method is characterized in that corresponding point data between a first image and a second image have been generated by analyzing the first and second images in a multiresolutional manner at a coding side but the analyzing has been discontinued at a stage prior to reaching final resolution of the first and second images, and includes analyzing for remaining resolution stages at a decoding side using a simplified method so that completed or final coded data are available at the decoding side.

In a particular case, this method may further include generating an intermediate image of the first and second images based on the completed coded data and outputting the intermediate image.

In the embodiments, the base technology can be used to generate corresponding point data between the first and second images in the coding method and to generate an intermediate image based on the coded data in the decoding method. However, the base technology is not a necessary part of the embodiments.

It is to be noted that it is also possible to have replacement or substitution of the above-described structural components and elements of methods in part or whole as between method and apparatus or to add elements to either method or apparatus and also, the apparatuses and methods may be implemented by a computer program and saved on a recording medium or the like and are all effective as and encompassed by the present invention.

Moreover, this summary of the invention includes features that may not be necessary features such that an embodiment of the present invention may also be a subcombination of these described features.

BRIEF DESCRIPTION OF THE DRAWINGS

FIG. 1a is an image obtained as a result of the application of an averaging filter to a human facial image.

FIG. 1b is an image obtained as a result of the application of an averaging filter to another human facial image.

FIG. 1c is an image of a human face at $p^{(5,0)}$ obtained in a preferred embodiment in the base technology.

FIG. 1d is another image of a human face at $p^{(5,0)}$ obtained in a preferred embodiment in the base technology.

FIG. 1e is an image of a human face at $p^{(5,1)}$ obtained in a preferred embodiment in the base technology.

FIG. 1f is another image of a human face at $p^{(5,1)}$ obtained in a preferred embodiment in the base technology.

FIG. 1g is an image of a human face at $p^{(5,2)}$ obtained in a preferred embodiment in the base technology.

FIG. 1h is another image of a human face at $p^{(5,2)}$ obtained in a preferred embodiment in the base technology.

FIG. 1i is an image of a human face at $p^{(5,3)}$ obtained in a preferred embodiment in the base technology.

FIG. 1j is another image of a human face at $p^{(5,3)}$ obtained in a preferred embodiment in the base technology.

FIG. 2R shows an original quadrilateral.

FIG. 2A shows an inherited quadrilateral.

FIG. 2B shows an inherited quadrilateral.

FIG. 2C shows an inherited quadrilateral.

FIG. 2D shows an inherited quadrilateral.

FIG. 2E shows an inherited quadrilateral.

FIG. 9 is a diagram showing correspondence between partial images of the m-th and (m−1)th levels of resolution.

DETAILED DESCRIPTION OF THE INVENTION

Figure 3:
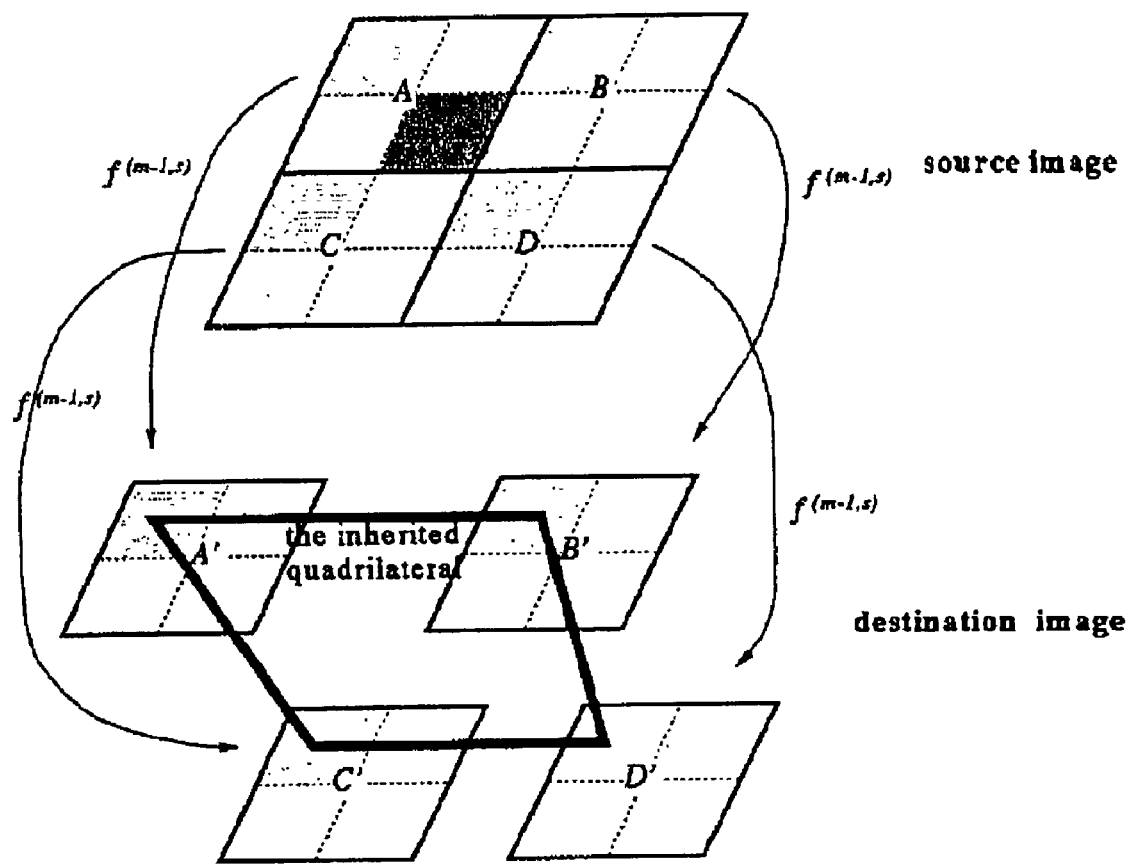
FIG. 3 is a diagram showing the relationship between a source image and a destination image and that between the m-th level and the (m−1)th level, using a quadrilateral.

The invention will now be described based on the preferred embodiments, which are not intended to limit the scope of, but rather, exemplify, the present invention. All of the features and the combinations thereof described in the embodiments are not necessarily essential to the invention.

First, the multiresolutional critical point filter technology and the image matching processing using the technology, both of which will be utilized in the preferred embodiments, will be described in detail as "Base Technology". However, it is to be noted that the image matching techniques provided in the present embodiments are not limited to these base techniques. More particularly, the sections [1] and [2] (below) belong to the base technology, where section [1] describes elemental techniques and section [2] describes a processing procedure. These techniques are patented under Japanese Patent No. 2927350, and U.S. Pat. Nos. 6,018,592 and 6,137,910, owned by the same assignee of the present invention, the contents of which are hereby incorporated herein by reference. Section [3] describes various possible improvements in the base technology. Thereafter, in relation to FIGS. 19 to 23, image processing and data coding and decoding techniques, utilizing, in part, the base technology, will be described in more detail.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution. Initially, let the width of an image to be examined be N and the height of the image be M. For simplicity, assume that $N=M=2n$ where n is a positive integer. An interval $[0, N] \subset R$ is denoted by I. A pixel of the image at position (i,j) is denoted by $p^{(i,j)}$ where $i,j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutinal filter then extracts the critical points from the original image to construct another image having a lower resolution. Here, the size of each of the respective images of the m-th level is denoted as $2^m \times 2^m$ ($0 \leq m \leq n$). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)}))$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$ (1)

where we let $$p_{(i,j)}^{(n,0)} = p_{(i,j)}^{(n,1)} = p_{(i,j)}^{(n,2)} = p_{(i,j)}^{(n,3)} = p_{(i,j)}$$ (2)

The above four images are referred to as subimages hereinafter. When $\min_{x \leq t \leq x+1}$ and $\max_{x \leq t \leq x+1}$ are abbreviated to $\alpha$ and $\beta$, respectively, the subimages can be expressed as follows:

$$p^{(m,0)} = \alpha(x)\alpha(y)p^{(m+1,0)}$$

$$p^{(m,1)} = \alpha(x)\beta(y)p^{(m+1,1)}$$

$$p^{(m,2)} = \beta(x)\alpha(y)p^{(m+1,2)}$$

$$p^{(m,2)} = \beta(x)\beta(y)p^{(m+1,3)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $p_{(i,j)}^{(n)}$ and that of the destination image at (k,l) is denoted by $q_{(k,l)}^{(n)}$ where i, j, k, $l \in I$. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}: p^{(m,0)} \to q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,1)}$ (i=0, 1, 2, . . . ) is referred to as a submapping. The order of i will be rearranged as shown in the following equation (3) in computing $f^{(m,i)}$ for reasons to be described later.

$$f^{(m,i)}: p^{(m,\sigma(i))} \to q^{(m,\sigma(i))}$$ (3)

where $\sigma(i) \in \{0, 1, 2, 3\}$.

[1.3.1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base technology, a pixel is specified by a co-ordinate point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ (s=0, 1, ...), where $f_{(i,j)}^{(m,s)}=(k,l)$ means that $p_{(i,j)}^{(m,s)}$ of the source image is mapped to $q_{(k,l)}^{(m,s)}$ of the destination image. For simplicity, when $f(i,j)=(k,l)$ holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p_{(i,j)}^{(m,s)} p_{(i+1,j)}^{(m,s)} p_{(i+1,j+1)}^{(m,s)} p_{(i,j+1)}^{(m,s)} \quad (4)$$

where i=0, ..., $2^m-1$, and j=0, ..., $2^m-1$. The edges of R are directed as follows:

$$\overrightarrow{p_{(i,j)}^{(m,s)} p_{(i+1,j)}^{(m,s)}}, \quad \overrightarrow{p_{(i+1,j)}^{(m,s)} p_{(i+1,j+1)}^{(m,s)}}, \quad \overrightarrow{p_{(i+1,j+1)}^{(m,s)} p_{(i,j+1)}^{(m,s)}} \text{ and } \overrightarrow{p_{(i,j+1)}^{(m,s)} p_{(i,j)}^{(m,s)}} \quad (5)$$

This square region R will be mapped by f to a quadrilateral on the destination image plane:

$$q_{f(i,j)}^{(m,s)} q_{f(i+1,j)}^{(m,s)} q_{f(i+1,j+1)}^{(m,s)} q_{f(i,j+1)}^{(m,s)} \quad (6)$$

This mapping $f^{(m,s)}(R)$, that is, $$f^{(m,s)}(R) = f^{(m,s)}(p_{(i,j)}^{(m,s)} p_{(i+1,j)}^{(m,s)} p_{(i+1,j+1)}^{(m,s)} p_{(i,j+1)}^{(m,s)}) = q_{f(i,j)}^{(m,s)} q_{f(i+1,j)}^{(m,s)} q_{f(i+1,j+1)}^{(m,s)} q_{f(i,j+1)}^{(m,s)}$$

should satisfy the following bijectivity conditions(referred to as BC hereinafter):

1. The edges of the quadrilateral $f^{(m,s)}(R)$ should not intersect one another.
2. The orientation of the edges of $f^{(m,s)}(R)$ should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}(R)$ may be zero. Namely, $f^{(m,s)}(R)$ may be a triangle. However, $f^{(m,s)}(R)$ is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, $f(i,j)=(i,j)$ (on the four lines of i=0, i=$2^m-1$, j=0, j=$2^m-1$). This condition will be hereinafter referred to as an additional condition.

[1.3.2] Energy of Mapping

[1.3.2.1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $C_{(i,j)}^{(m,s)}$ of the mapping $f^{(m,s)}$ at (i,j) is determined by the following equation (7).

$$C_{(i,j)}^{(m,s)} = |V(p_{(i,j)}^{(m,s)}) - V(q_{f(i,j)}^{(m,s)})|^2 \quad (7)$$

where $V(p_{(i,j)}^{(m,s)})$ and $V(q_{f(i,j)}^{(m,s)})$ are the intensity values of the pixels $p_{(i,j)}^{(m,s)}$ and $q_{f(i,j)}^{(m,s)}$, respectively. The total energy $C^{(m,s)}$ of f is a matching evaluation equation, and can be defined as the sum of $C_{(i,j)}^{(m,s)}$ as shown in the following equation (8).

$$C_f^{(m,s)} = \sum_{i=0}^{i=2^m-1} \sum_{j=0}^{j=2^m-1} C_{(i,j)}^{(m,s)} \quad (8)$$

[1.3.2.2] Cost Related to the Locations of the Pixel for Smooth Mapping

In order to obtain smooth mappings, another energy $D_f$ for the mapping is introduced. The energy $D_f$ is determined by the locations of $p_{(i,j)}^{(m,s)}$ and $q_{f(i,j)}^{(m,s)}$ (i=0, 1, ..., $2^m-1$, j=0, 1, ..., $2^m-1$), regardless of the intensity of the pixels. The energy $D_{(i,j)}^{(m,s)}$ of the mapping $f^{(m,s)}$ at a point (i,j) is determined by the following equation (9).

$$D_{(i,j)}^{(m,s)} = \eta E_{0(i,j)}^{(m,s)} + E_{1(i,j)}^{(m,s)} \quad (9)$$

where the coefficient parameter η which is equal to or greater than 0 is a real number. And we have $$E_{0(i,j)}^{(m,s)} = \|(i,j) - f^{(m,s)}(i,j)\|^2 \quad (10)$$

$$E_{1(i,j)}^{(m,s)} = \sum_{i'=i-1}^{i} \sum_{j'=j-1}^{j} \|(f^{(m,s)}(i,j) - (i,j)) - (f^{(m,s)}(i',j') - (i',j'))\|^2 / 4 \quad (11)$$

where $$\|(x,y)\| = \sqrt{x^2 + y^2} \quad (12),$$

i' and j' are integers and f(i',j') is defined to be zero for i'<0 and j'<0. $E_0$ is determined by the distance between (i,j) and f(i,j). $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of p(i,j) and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \quad (13)$$

[1.3.2.3] Total Energy of the Mapping

The total energy of the mapping, that is, a combined evaluation equation which relates to the combination of a plurality of evaluations, is defined as $\lambda C_f^{(m,s)}+D_f^{(m,s)}$, where $\lambda \geqq 0$ is a real number. The goal is to detect a state in which the combined evaluation equation has an extreme value, namely, to find a mapping which gives the minimum energy expressed by the following:

$$\min\{\lambda C_f^{(m,s)}+D_f^{(m,s)}\} \qquad (14)$$

Care must be exercised in that the mapping becomes an identity mapping if $\lambda=0$ and $\eta=0$ (i.e., $f^{(m,s)}(i,j)=(i,j)$ for all $i=0, 1, \ldots, 2^m-1$ and $j=0, 1, \ldots, 2^m-1$). As will be described later, the mapping can be gradually modified or transformed from an identity mapping since the case of $\lambda=0$ and $\eta=0$ is evaluated at the outset in the base technology. If the combined evaluation equation is defined as $C_f^{(m,s)}+\lambda D_f^{(m,s)}$ where the original position of $\lambda$ is changed as such, the equation with $\lambda=0$ and $\eta=0$ will be $C_f^{(m,s)}$ only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1.3.3] Determining the Mapping with Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{j}{2} \right\rfloor\right), \qquad (15)$$

where $\lfloor x \rfloor$ denotes the largest integer not exceeding x, $p_{(i',j')}^{(m-1,s)}$ and $q_{(i',j')}^{(m-1,s)}$ are respectively called the parents of $p_{(i,j)}^{(m,s)}$ and $q_{(i,j)}^{(m,s)}$. Conversely, $p_{(i,j)}^{(m-1,s)}$ and $q_{(i,j)}^{(m,s)}$ are the child of $p_{(i',j')}^{(m-1,s)}$ and the child of $q_{(i',j')}^{(m,s)}$, respectively. A function parent (i,j) is defined by the following equation (16):

$$parent(i,j) = \left(\left\lfloor \frac{i}{2} \right\rfloor, \left\lfloor \frac{j}{2} \right\rfloor\right) \qquad (16)$$

Now, a mapping between $p_{(i,j)}^{(m,s)}$ and $q_{(k,l)}^{(m,s)}$ is determined by computing the energy and finding the minimum thereof. The value of $f^{(m,s)}(i,j)=(k,l)$ is determined as follows using f(m−1, s) (m=1, 2, ..., n). First of all, a condition is imposed that $q_{(k,l)}^{(m,s)}$ should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \qquad (17)$$

where $$g^{(m,s)}(i,j)=f^{(m-1,s)}(parent(i,j))+f^{(m-1,s)}(parent(i,j)+(1,1)) \qquad (18)$$

The quadrilateral defined above is hereinafter referred to as the inherited quadrilateral of $p_{(i,j)}^{(m,s)}$. The pixel minimizing the energy is sought and obtained inside the inherited quadrilateral.

FIG. 3 illustrates the above-described procedures. The pixels A, B, C and D of the source image are mapped to A', B', C' and D' of the destination image, respectively, at the (m−1)th level in the hierarchy. The pixel $p_{(i,j)}^{(m,s)}$ should be mapped to the pixel $q_{f^{(m)}(i,j)}^{(m,s)}$ which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0_{(i,j)}}=\|f^{(m,0)}(i,j)-g^{(m)}(i,j)\|^2 \qquad (19)$$

$$E_{0_{(i,j)}}=\|f^{(m,s)}(i,j)-f^{(m,s-1)}(i,j)\|^2, (1 \leqq i) \qquad (20)$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m−1) the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $L_{max}^{(m)}$. $L_{max}^{(m)}$ is fixed for each level m. If no pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1.4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the base technology, the optimal parameter values can be obtained completely automatically.

The systems according to this base technology include two parameters, namely, $\lambda$ and $\eta$, where $\lambda$ and $\eta$ represent the weight of the difference of the pixel intensity and the stiffness of the mapping, respectively. In order to automatically determine these parameters, the are initially set to 0. First, $\lambda$ is gradually increased from $\lambda=0$ while $\eta$ is fixed at 0. As $\lambda$ becomes larger and the value of the combined evaluation equation (equation (14)) is minimized, the value of $C_f^{(m,s)}$ for each submapping generally becomes smaller. This basically means that the two images are matched better. However, if $\lambda$ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $D_f^{(m,s)}$ in equation (14) tends to increase abruptly.
4. As a result, since the value of equation (14) tends to increase abruptly, $f^{(m,s)}$ changes in order to suppress the abrupt increase of $D_f^{(m,s)}$. As a result, $C_f^{(m,s)}$ increases.

Therefore, a threshold value at which $C_f^{(m,s)}$ turns to an increase from a decrease is detected while a state in which equation (14) takes the minimum value with $\lambda$ being increased is kept. Such $\lambda$ is determined as the optimal value at $\eta=0$. Next, the behavior of $C_f^{(m,s)}$ is examined while $\eta$ is increased gradually, and $\eta$ will be automatically determined by a method described later. $\lambda$ will then again be determined corresponding to such an automatically determined $\eta$.

The above-described method resembles the focusing mechanism of human visual systems. In the human visual systems, the images of the respective right eye and left eye are matched while moving one eye. When the objects are clearly recognized, the moving eye is fixed.

[1.4.1] Dynamic Determination of $\lambda$

Initially, $\lambda$ is increased from 0 at a certain interval, and a subimage is evaluated each time the value of $\lambda$ changes. As shown in equation (14), the total energy is defined by $\lambda C_f^{(m,s)} + D_f^{(m,s)}$. $D_{(i,j)}^{(m,s)}$ in equation (9) represents the smoothness and theoretically becomes minimum when it is the identity mapping. $E_0$ and $E_1$ increase as the mapping is further distorted. Since $E_1$ is an integer, 1 is the smallest step of $D_f^{(m,s)}$. Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_f^{(m,s)}$ is reduced by more than 1.

Under this condition, it is shown that $C_{(i,j)}^{(m,s)}$ decreases in normal cases as $\lambda$ increases. The histogram of $C_{(i,j)}^{(m,s)}$ is denoted as $h(l)$, where $h(l)$ is the number of pixels whose energy $C_{(i,j)}^{(m,s)}$ is $l^2$. In order that $\lambda l^2 \geq 1$ for example, the case of $l^2 = 1/\lambda$ is considered. When $\lambda$ varies from $\lambda_1$ to $\lambda_2$, a number of pixels (denoted A) expressed by the following equation (21):

$$A = \sum_{l=\lceil \frac{1}{\lambda_2} \rceil}^{\lfloor \frac{1}{\lambda_1} \rfloor} h(l) \cong \int_{l=\frac{1}{\lambda_2}}^{\frac{1}{\lambda_1}} h(l) dl = -\int_{\lambda_2}^{\lambda_1} h(l) \frac{1}{\lambda^{3/2}} d\lambda = \int_{\lambda_1}^{\lambda_2} \frac{h(l)}{\lambda^{3/2}} d\lambda \quad (21)$$

changes to a more stable state having the energy shown in equation (22):

$$C_f^{(m,s)} - l^2 = C_f^{(m,s)} - \frac{1}{\lambda}. \quad (22)$$

Here, it is assumed that the energy of these pixels is approximated to be zero. This means that the value of $C^{(i,j)(m,s)}$ changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since $h(l)>0$, $C_f^{(m,s)}$ decreases in the normal case. However, when $\lambda$ exceeds the optimal value, the above phenomenon, that is, an increase in $C_f^{(m,s)}$ occurs. The optimal value of $\lambda$ is determined by detecting this phenomenon.

When $$h(l) = H l^k = \frac{H}{\lambda^{k/2}} \quad (25)$$

is assumed, where both $H(H>0)$ and $k$ are constants, the equation (26) holds:

$$\frac{\partial C_f^{(m,s)}}{\partial \lambda} = -\frac{H}{\lambda^{5/2+k/2}} \quad (26)$$

Then, if $k \neq -3$, the following equation (27) holds:

$$C_f^{(m,s)} = C + \frac{H}{(3/2 + k/2)\lambda^{3/2+k/2}} \quad (27)$$

The equation (27) is a general equation of $C_f^{(m,s)}$ (where C is a constant).

When detecting the optimal value of $\lambda$, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l)=Hl^k$, the following equation (31), for example, $$B_0 \lambda^{3/2+k/2} = p_0 H \quad (31)$$

becomes a constant. However, when $\lambda$ exceeds the optimal value, the above value of equation (31) increases abruptly. By detecting this phenomenon, i.e. whether or not the value of $B_0 \lambda^{3/2+k/2}/2^m$ exceeds an abnormal value $B_{0_{thres}}$, the optimal value of $\lambda$ can be determined. Similarly, whether or not the value of $B_0 \lambda^{3/2+k/2}/2^m$ exceeds an abnormal value $B_{1_{thres}}$ can be used to check for an increasing rate $B_1$ of pixels violating the third condition of the BC. The reason why the factor $2^m$ is introduced here will be described at a later stage. This system is not sensitive to the two threshold values $B_{0_{thres}}$ and $B_{1_{thres}}$. The two threshold values $B_{0_{thres}}$ and $B_{1_{thres}}$ can be used to detect excessive distortion of the mapping which may not be detected through observation of the energy $C_f^{(m,s)}$.

In the experimentation, when $\lambda$ exceeded 0.1 the computation of $f^{(m,s)}$ was stopped and the computation of $f^{(m,s+1)}$ was started. That is because the computation of submappings is affected by a difference of only 3 out of 255 levels in pixel intensity when $\lambda > 0.1$ and it is then difficult to obtain a correct result.

[1.4.2] Histogram h(l)

The examination of $C_f^{(m,s)}$ does not depend on the histogram h(l), however, the examination of the BC and its third condition may be affected by h(l). When $(\lambda, C_f^{(m,s)})$ is actually plotted, k is usually close to 1. In the experiment, k=1 is used, that is, $B_0 \lambda^2$ and $B_1 \lambda^2$ are examined. If the true value of k is less than 1, $B_0 \lambda^2$ and $B_1 \lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_{0_{thres}}$ appropriately.

Let us model the source image by a circular object, with its center at $(x_0, y_0)$ and its radius r, given by:

$$p(i, j) = \begin{cases} \frac{255}{r} c\left(\sqrt{(i-x_0)^2 + (j-y_0)^2}\right) & \ldots \left(\sqrt{(i-x_0)^2 + (j-y_0)^2} \leq r\right) \\ 0 \ldots \text{(otherwise)} \end{cases} \quad (32)$$

and the destination image given by:

$$q(i, j) = \begin{cases} \frac{255}{r} c\left(\sqrt{(i-x_1)^2 + (j-y_1)^2}\right) & \ldots \left(\sqrt{(i-x_1)^2 + (j-y_1)^2} \leq r\right) \\ 0 \ldots \text{(otherwise)} \end{cases} \quad (33)$$

with its center at $(x_1, y_1)$ and radius r. In the above, let $c(x)$ have the form of $c(x)=x^k$. When the centers $(x_0, y_0)$ and $(x_1, y_1)$ are sufficiently far from each other, the histogram h(l) is then in the form:

$$h(l) \propto rl^k (k \neq 0) \quad (34)$$

When k=1, the images represent objects with clear boundaries embedded in the background. These objects become darker toward their centers and brighter toward their boundaries. When k=−1, the images represent objects with vague boundaries. These objects are brightest at their centers, and become darker toward their boundaries. Without much loss of generality, it suffices to state that objects in images are generally between these two types of objects. Thus, choosing k such that $-1 \leq k \leq 1$ can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1.4.3] Dynamic Determination of η

The parameter η can also be automatically determined in a similar manner. Initially, η is set to zero, and the final mapping $f^{(n)}$ and the energy $C_f^{(n)}$ at the finest resolution are computed. Then, after η is increased by a certain value Δη, the final mapping $f^{(n)}$ and the energy $C_f^{(n)}$ at the finest resolution are again computed. This process is repeated until the optimal value of η is obtained. η represents the stiffness of the mapping because it is a weight of the following equation (35):

$$E_{0_{(i,j)}}^{(m,s)} = \|f^{(m,s)}(i,j) - f^{(m,s-1)}(i,j)\|^2 \quad (35)$$

Figure 4:
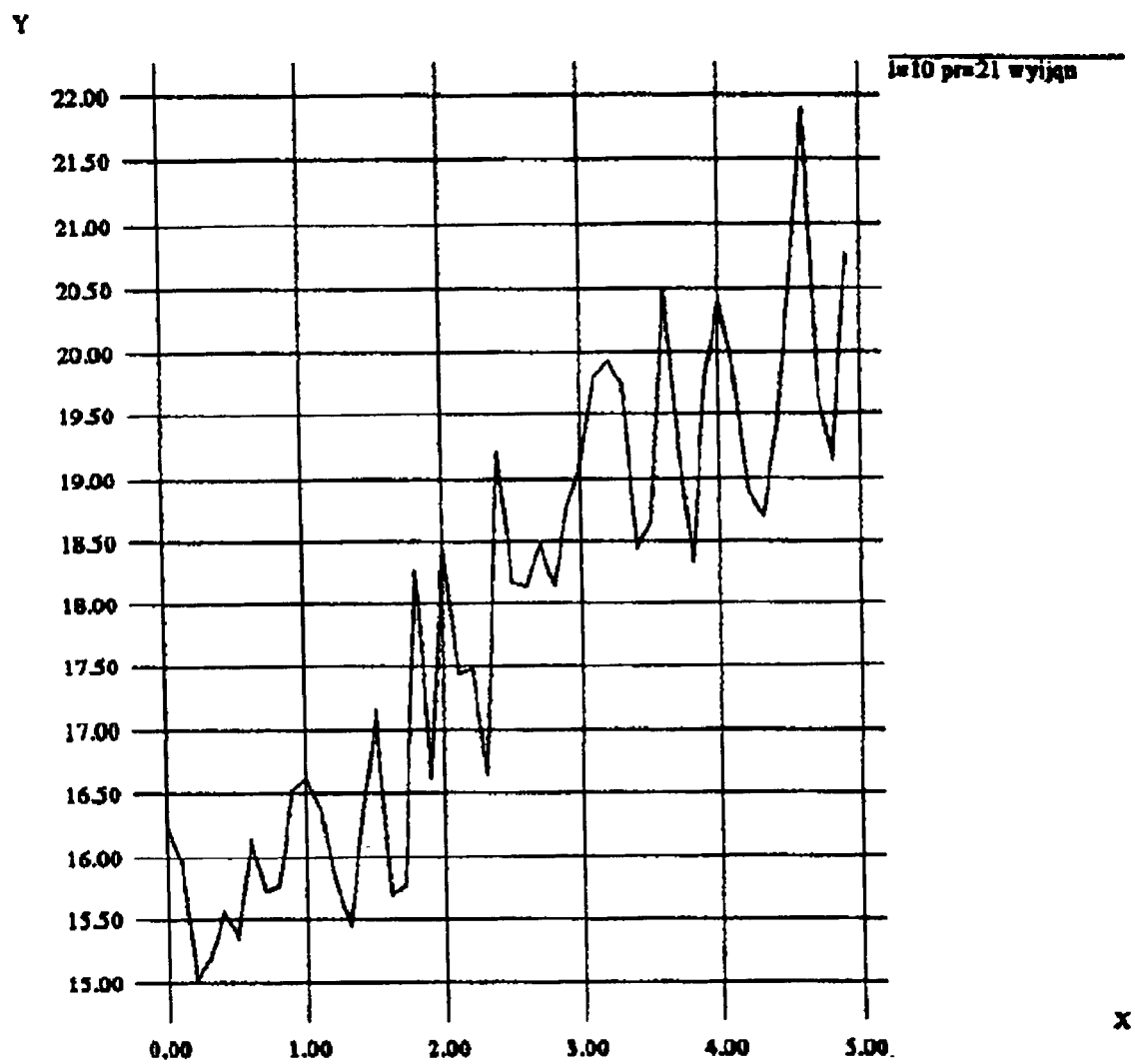
FIG. 4 shows the relationship between a parameters (represented by x-axis) and energy $C_f$ (represented by y-axis).

If η is zero, $D_f^{(n)}$ is determined irrespective of the previous submapping, and the present submapping may be elastically deformed and become too distorted. On the other hand, if η is a very large value, $D_f^{(n)}$ is almost completely determined by the immediately previous submapping. The submappings are then very stiff, and the pixels are mapped to almost the same locations. The resulting mapping is therefore the identity mapping. When the value of η increases from 0, $C_f^{(n)}$ gradually decreases as will be described later. However, when the value of η exceeds the optimal value, the energy starts increasing as shown in FIG. 4. In FIG. 4, the x-axis represents η, and y-axis represents $C_f$.

The optimum value of η which minimizes $C_f^{(n)}$ can be obtained in this manner. However, since various elements affect this computation as compared to the case of λ, $C_f^{(n)}$ changes while slightly fluctuating. This difference is caused because a submapping is re-computed once in the case of λ whenever an input changes slightly, whereas all the submappings must be re-computed in the case of η. Thus, whether the obtained value of $C_f^{(n)}$ is the minimum or not cannot be determined as easily. When candidates for the minimum value are found, the true minimum needs to be searched by setting up further finer intervals.

[1.5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V(q_{f^{(m,s)}(i,j)}^{(m,s)}) \tag{36}$$

That is, supersampling is performed. In an example implementation, $f^{(m,s)}$ may take integer and half integer values, and $$V(q_{(i,j)+(0.5,0.5)}^{(m,s)}) \tag{37}$$

is given by $$(V(q_{(i,j)}^{(m,s)})+V(q_{(i,j)+(1,1)}^{(m,s)}))/2 \tag{38}$$

[1.6] Normalization of the Pixel Intensity of Each Image

When the source and destination images contain quite different objects, the raw pixel intensity may not be used to compute the mapping because a large difference in the pixel intensity causes excessively large energy $C_f^{(m,s)}$ and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1.7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}(i,j)$ is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}(i,j)$ (m=0, . . . , n) that satisfy the BC are chosen as much as possible from the candidates (k,l) by imposing a penalty on the candidates violating the BC. The energy $D_{(k,l)}$ of a candidate that violates the third condition of the BC is multiplied by φ and that of a candidate that violates the first or second condition of the BC is multiplied by ψ. In this implementation, φ=2 and ψ=100000 are used.

In order to check the above-mentioned BC, the following test may be performed as the procedure when determining (k,l)=$f^{(m,s)}$(i,j). Namely, for each grid point (k,l) in the inherited quadrilateral of $f^{(m,s)}$(i,j), whether or not the z-component of the outer product of $$W = \vec{A} \times \vec{B} \tag{39}$$

is equal to or greater than 0 is examined, where $$\vec{A} = \overrightarrow{q_{f^{(m,s)}(i,j-1)}^{(m,s)} q_{f^{(m,s)}(i+1,j-1)}^{(m,s)}} \tag{40}$$

$$\vec{B} = \overrightarrow{q_{f^{(m,s)}(i,j-1)}^{(m,s)} q_{(k,l)}^{(m,s)}} \tag{41}$$

Here, the vectors are regarded as 3D vectors and the z-axis is defined in the orthogonal right-hand coordinate system. When W is negative, the candidate is imposed with a penalty by multiplying $D_{(k,l)}^{(m,s)}$ by ψ so that it is not as likely to be selected.

Figure 5A:
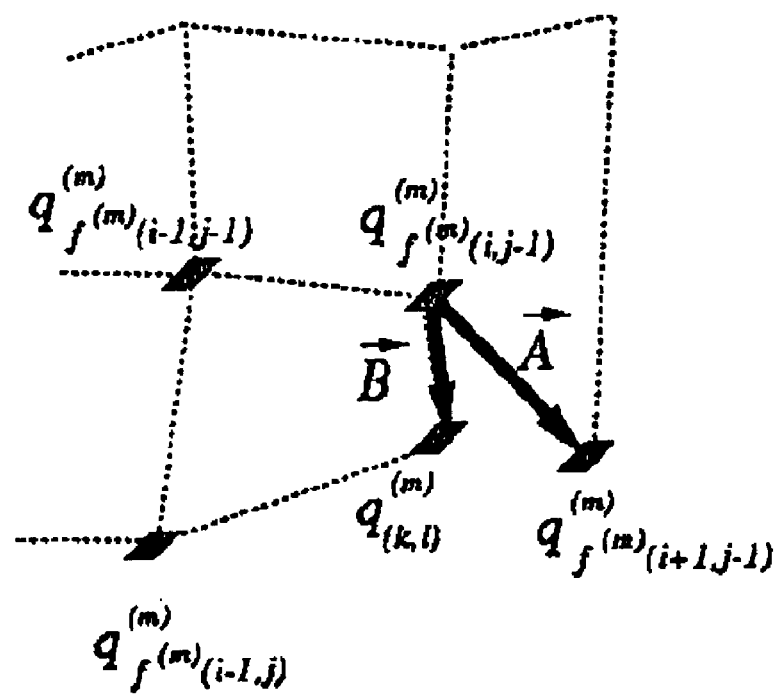
FIG. 5a is a diagram illustrating determination of whether or not the mapping for a certain point satisfies the bijectivity condition through the outer product computation.
Figure 5B:
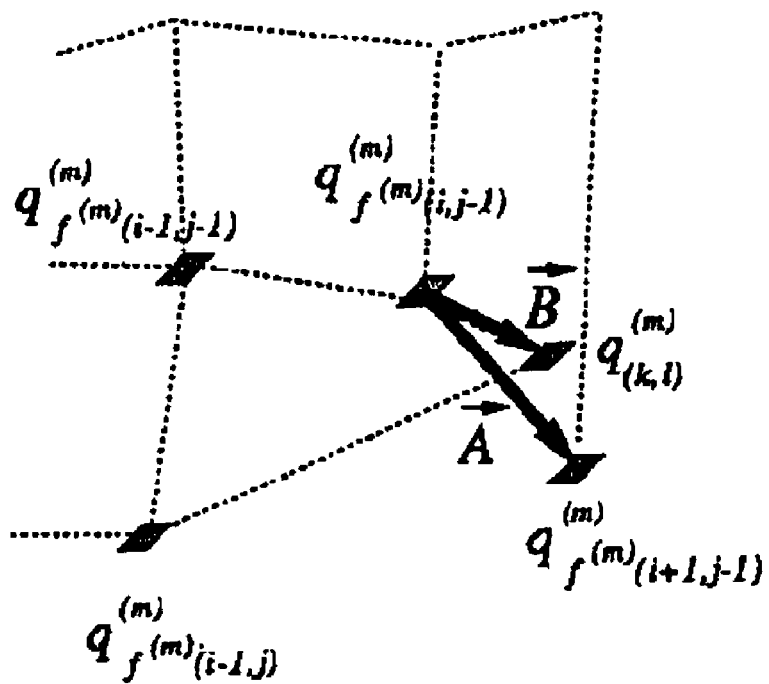
FIG. 5b is a diagram illustrating determination of whether or not the mapping for a certain point satisfies the bijectivity condition through the outer product computation.

FIGS. 5(a) and 5(b) illustrate the reason why this condition is inspected. FIG. 5(a) shows a candidate without a penalty and FIG. 5(b) shows one with a penalty. When determining the mapping $f^{(m,s)}$(i, j+1) for the adjacent pixel at (i, j+1), there is no pixel on the source image plane that satisfies the BC if the z-component of W is negative because then $q_{(k,l)}^{(m,s)}$ passes the boundary of the adjacent quadrilateral.

[1.7.1] The Order of Submappings

In this implementation, σ(0)=0, σ(1)=1, σ(2)=2, σ(3)=3, σ(4)=0 are used when the resolution level is even, while σ(0)=3, σ(1)=2, σ(2)=1, σ(3)=0, σ(4)=3 are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1.8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x, y, t) ($0 \leq x \leq N-1$, $0 \leq y \leq M-1$) whose distance from the source image plane is t ($0 \leq t \leq 1$) are obtained as follows. First, the location of the pixel r(x,y,t), where $x,y,t \in R$, is determined by equation (42):

$$(x, y) = (1 - dx)(1 - dy)(1 - t)(i, j) + (1 - dx)(1 - dy)tf(i, j) + \\ dx(1 - dy)(1 - t)(i+1, j) + dx(1 - dy)tf(i+1, j) + \\ (1 - dx)dy(1 - t)(i, j+1)(1 - dx)dytf(i, j+1) + \\ dxdy(1 - t)(i+1, j+1) + dxdytf(i+1, j+1)$$ (42)

The value of the pixel intensity at r(x,y,t) is then determined by equation (43):

$$V(r(x, y, t)) = \\ (1 - dx)(1 - dy)(1 - t)V(p_{(i,j)}) + (1 - dx)(1 - dy)tV(q_{f(i,j)}) + \\ dx(1 - dy)(1 - t)V(p_{(i+1,j)}) + dx(1 - dy)tV(q_{f(i+1,j)}) + \\ (1 - dx)dy(1 - t)V(p_{(i,j+1)}) + (1 - dx)dytV(q_{f(i,j+1)}) + \\ dxdy(1 - t)V(p_{(i+1,j+1)}) + dxdytV(q_{f(i+1,j+1)})$$ (43)

where dx and dy are parameters varying from 0 to 1.

[1.9] Mapping to which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0,j_0), p(i_1,j_1), \ldots, p(i_{n_s-1},j_{n_s-1})$$ (44)

of the source image are specified, the following values in the equation (45) are determined.

$$F^{(n)}(i_0,j_0)=(k_0,l_0), F^{(n)}(i_1,j_1)=(k_1,l_1), \ldots, F^{(n)}(i_{n_s-1}, j_{n_s-1})=(k_{n_s-1},l_{n_s-1})$$ (45)

For the remaining pixels of the source image, the amount of displacement is the weighted average of the displacement of $p(i_h, j_h)$ (h=0, ..., $n_s$-1). Namely, a pixel $p_{(i,j)}$ is mapped to the following pixel (expressed by the equation (46)) of the destination image.

$$F^{(m)}(i, j) = \frac{(i, j) + \sum_{h=0}^{h=n_s-1}(k_h - i_h, l_h - j_h)weight_h(i, j)}{2^{n-m}}$$ (46)

where $$weight_h(i, j) = \frac{1/\|(i_h - i, j_h - j)\|^2}{total\_weight(i, j)}$$ (47)

where $$total\_weight(i, j) = \sum_{h=0}^{h=n_s-1} 1/\|(i_h - i, j_h - j)\|^2$$ (48)

Second, the energy $D_{(i,j)}^{(m,s)}$ of the candidate mapping f is changed so that a mapping f similar to $F^{(m)}$ has a lower energy. Precisely speaking, $D_{(i,j)}^{(m,s)}$ is expressed by the equation (49):

$$D_{(i,j)}^{(m,s)}=E_{0(i,j)}^{(m,s)}+\eta E_{1(i,j)}^{(m,s)}+\kappa E_{2(i,j)}^{(m,s)}$$ (49)

where $$E_{2(i,j)}^{(m,s)} = \begin{cases} 0, \text{ if } \|F^{(m)}(i, j) - f^{(m,s)}(i, j)\|^2 \leq \left\lfloor \frac{\rho^2}{2^{2(n-m)}} \right\rfloor \\ \|F^{(m)}(i, j) - f^{(m,s)}(i, j)\|^2, \text{ otherwise} \end{cases}$$ (50)

where $\kappa, \rho \geq 0$. Finally, the resulting mapping f is determined by the above-described automatic computing process.

Note that $E_{2(i,j)}^{(m,s)}$ becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor$$ (51)

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
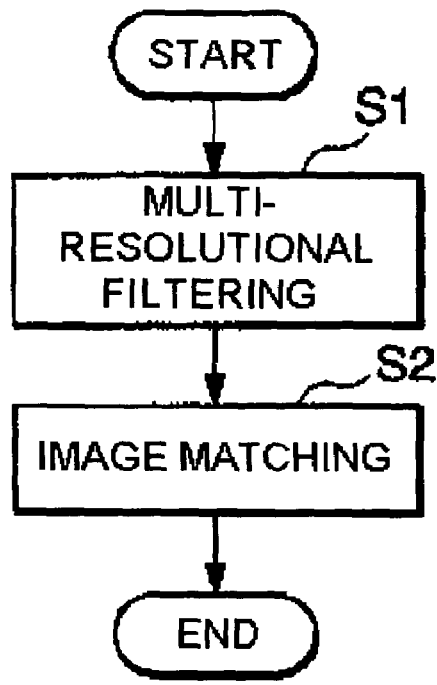
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
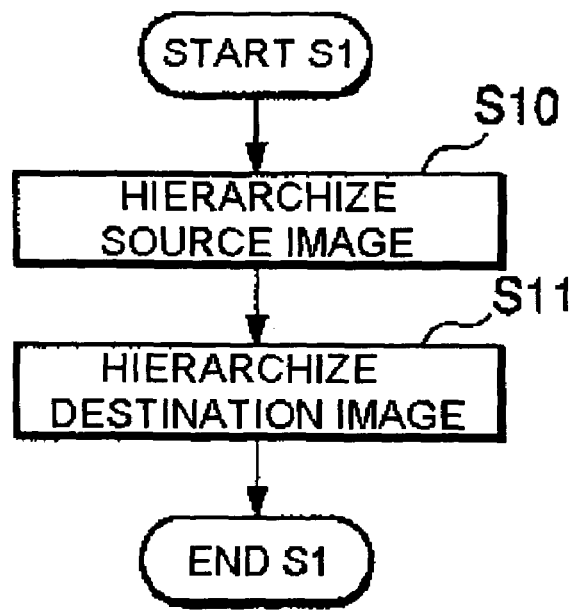
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
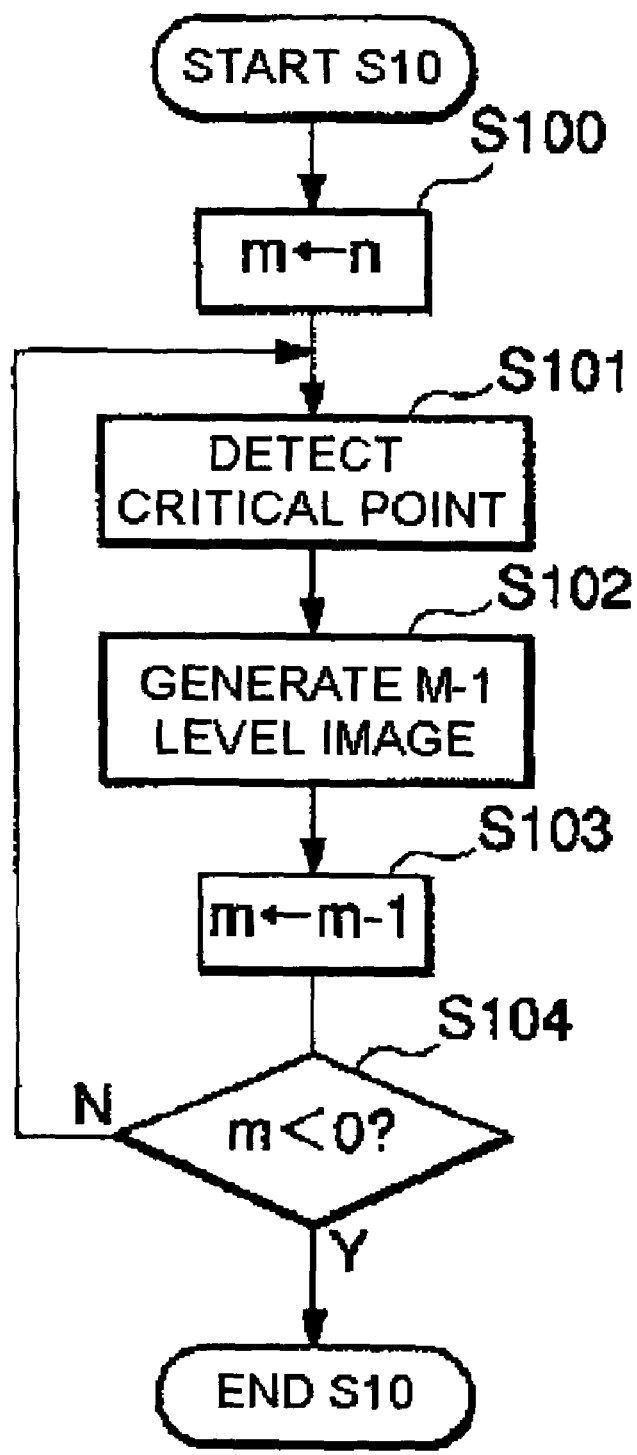
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m,3)}$ of the m-th level of resolution, using a critical point filter (S101), so that the images $p^{(m-1,0)}$, $p^{(m-1,1)}$, $p^{(m-1,2)}$ and $p^{(i-1,3)}$ of the (m−1)th level are generated (S102). Since m=n here, $p^{(m,0)}=p^{(m,1)}=p^{(m,2)}=p^{(m,3)}=p^{(n)}$ holds and four types of subimages are thus generated from a single source image.

Figure 9:
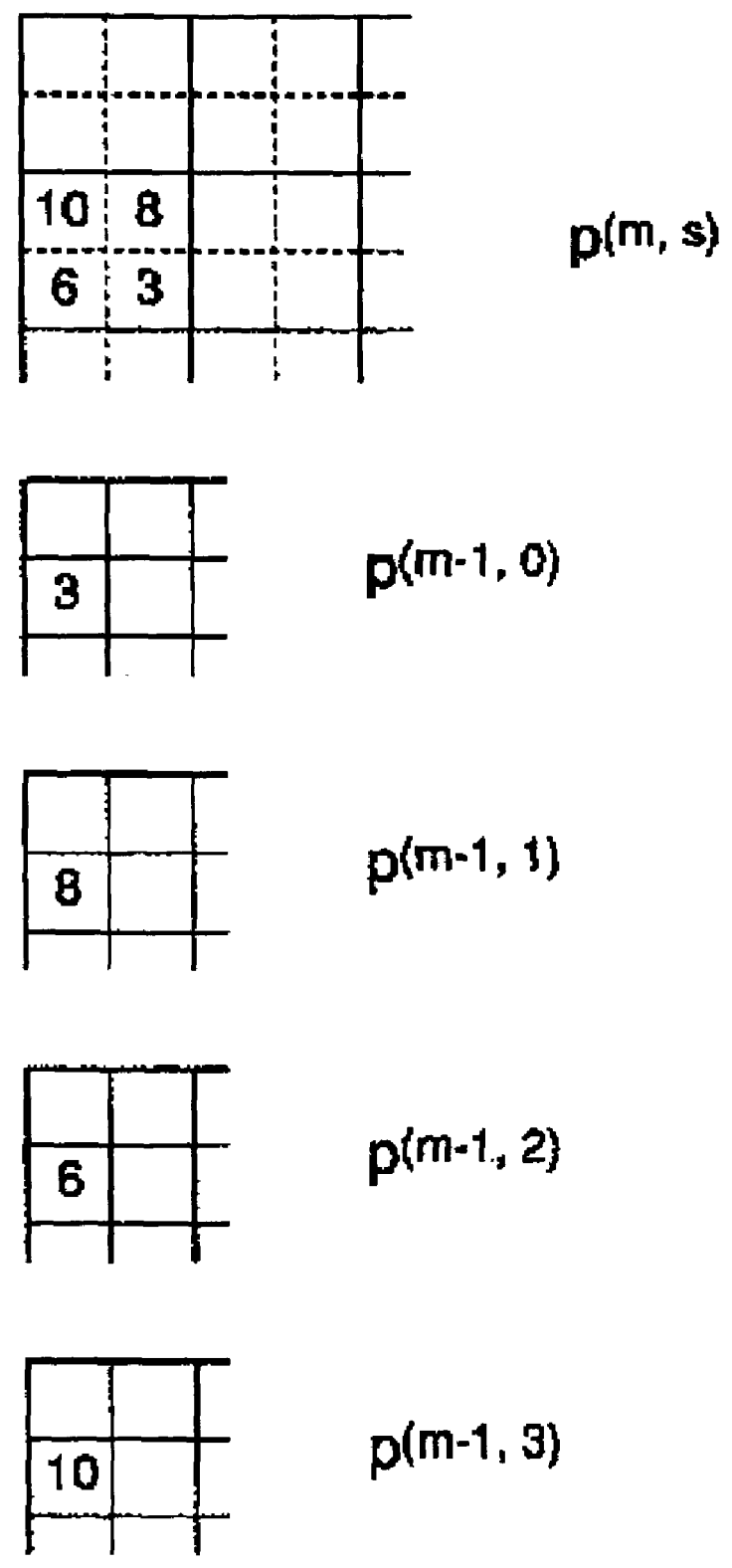

FIG. 9 shows correspondence between partial images of the m-th and those of (m−1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m−1)th level by respective single pixels thus acquired. Therefore, the size of the subimages at the (m−1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
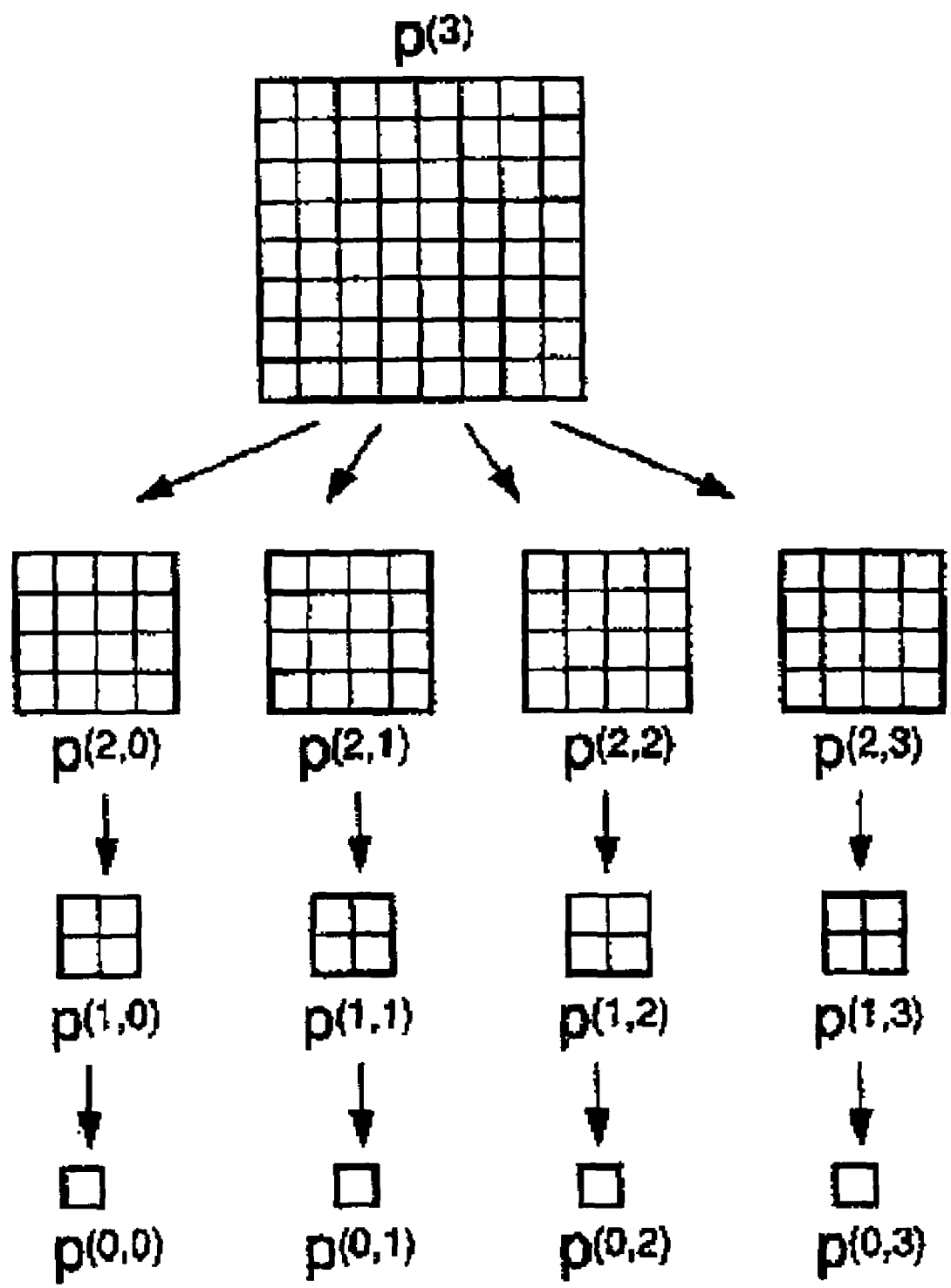
FIG. 10 is a diagram showing source hierarchical images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
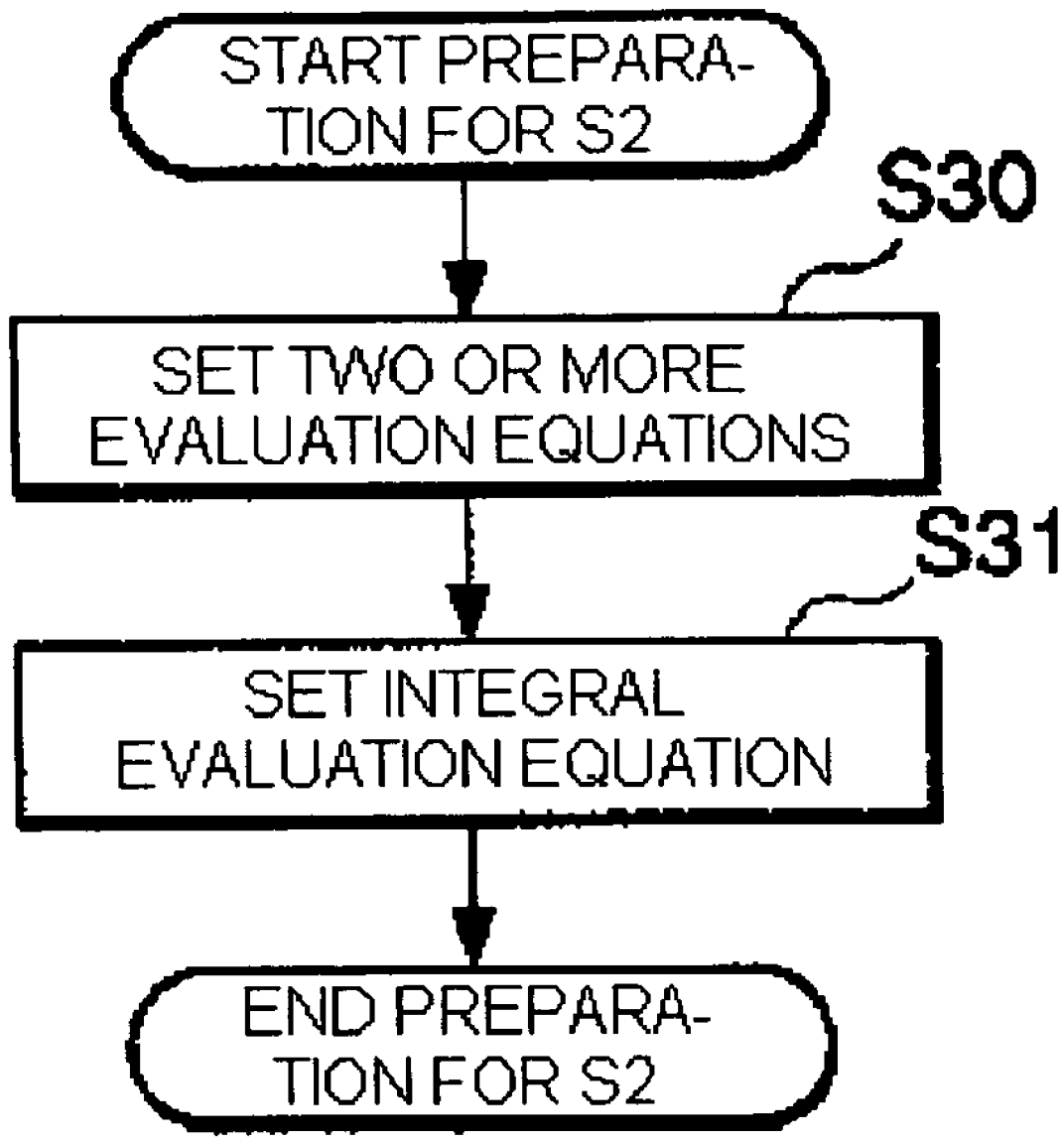
FIG. 11 is a flowchart of a preparation procedure for S2 in FIG. 6.

In this base technology, in order to proceed to S2 shown in FIG. 6, a matching evaluation is prepared. FIG. 11 shows the preparation procedure. Referring to FIG. 11, a plurality of evaluation equations are set (S30). The evaluation equations may include the energy $C_f^{(m,s)}$ concerning a pixel value, introduced in [1.3.2.1], and the energy $D_f^{(m,s)}$ concerning the smoothness of the mapping introduced in [1.3.2.2]. Next, by combining these evaluation equations, a combined evaluation equation is set (S31). Such a combined evaluation equation may be $\lambda C_{(i,j)}^{(m,s)} + D_f^{(m,s)}$. Using $\eta$ introduced in [1.3.2.2], we have $$\sum \sum (\lambda C_{(i,j)}^{(m,s)} + \eta E_{0(i,j)}^{(m,s)} + E_{1(i,j)}^{(m,s)}) \qquad (52)$$

In the equation (52) the sum is taken for each i and j where i and j run through 0, 1, ..., $2^{m-1}$. Now, the preparation for matching evaluation is completed.

Figure 12:
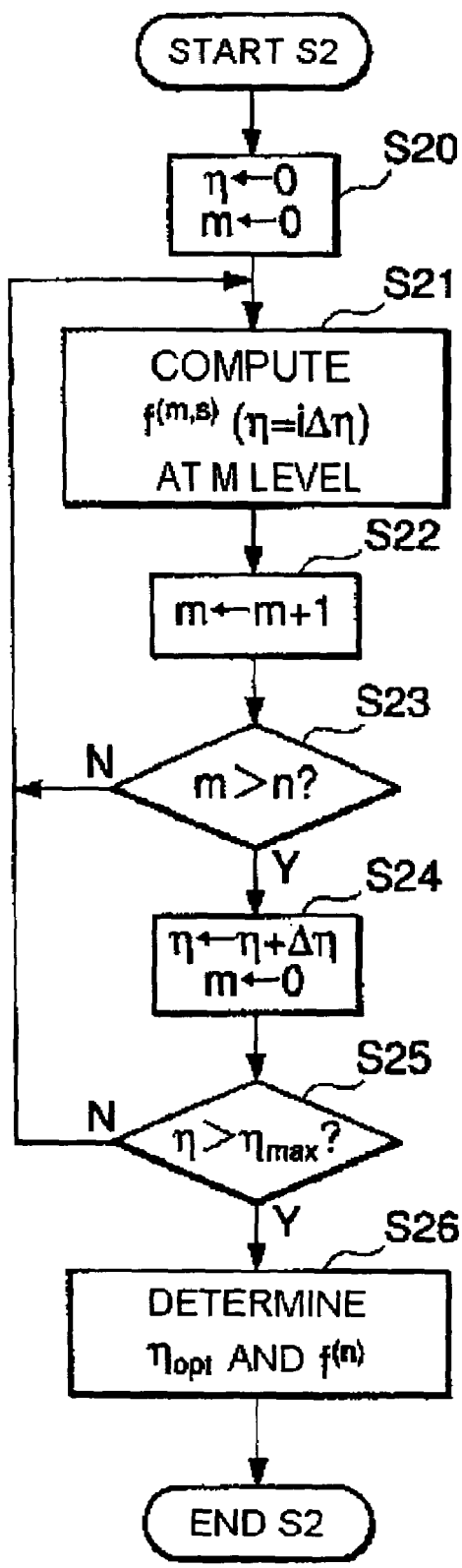
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter $\eta$ and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m−1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained subamppings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
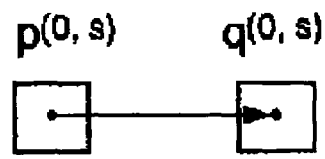
FIG. 13 is a diagram showing the way a submapping is determined at the 0-th level.
Figure 14:
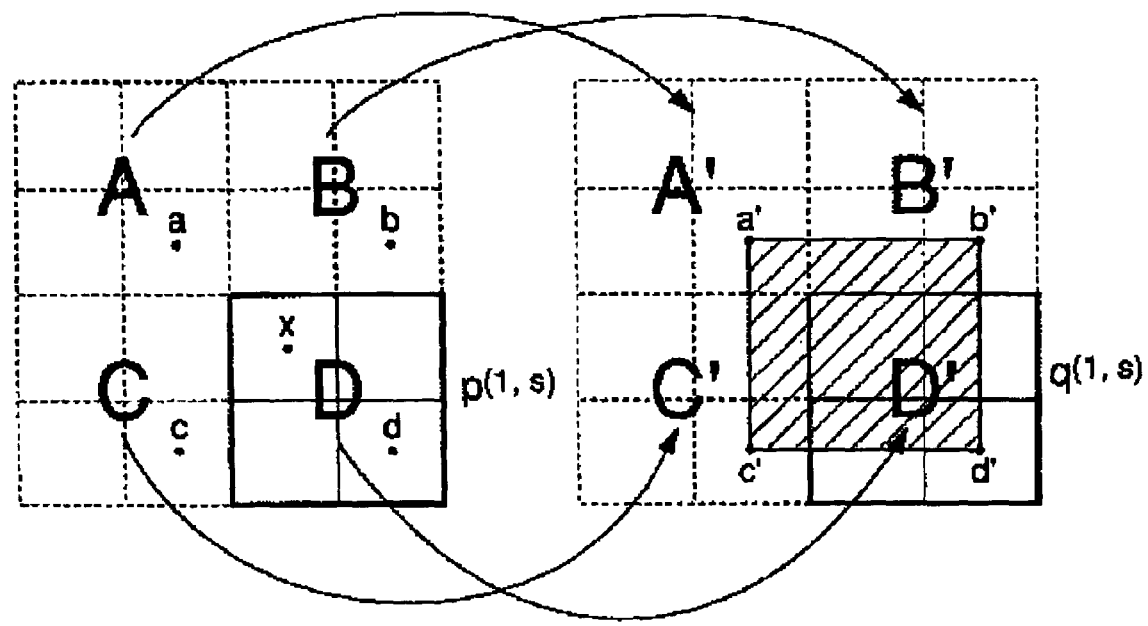
FIG. 14 is a diagram showing the way a submapping is determined at the first level.

FIG. 13 illustrates how the submapping is determined at the 0-th level. Since at the 0-th level each sub-image is constituted by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}(\eta=0)$ because it has been determined relative to $\eta=0$.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$(S25), the process returns to S21 and the mapping $f^{(n)}$ ($\eta=\Delta\eta$) relative to the new $\eta$ is obtained. This process is repeated while obtaining $f^{(n)}(\eta=i\Delta\eta)$ (i=0, 1, . . .) at S21. When $\eta$ exceeds $\eta_{max}$, the process proceeds to S26 and the optimal $\eta=\eta_{opt}$ is determined using a method described later, so as to let $f^{(n)}(\eta=\eta_{opt})$ be the final mapping $f^{(n)}$.

Figure 15:
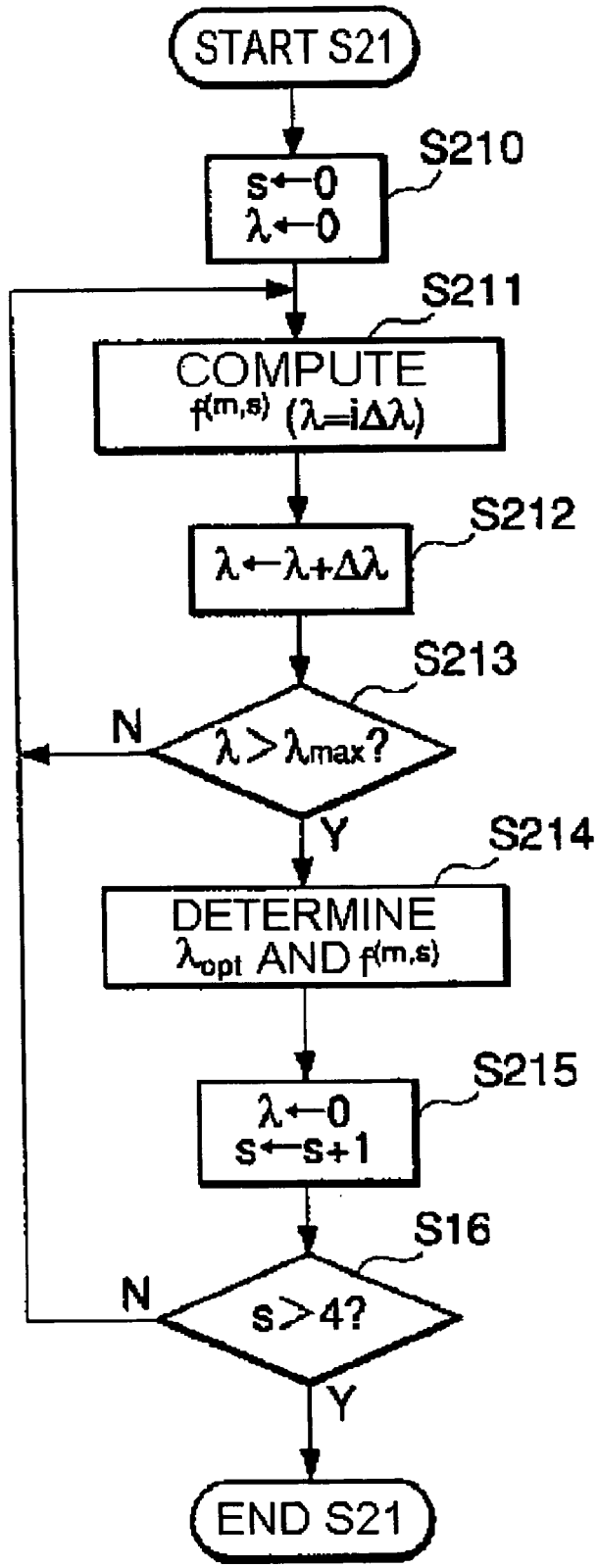
FIG. 15 is a flowchart showing the details of the process at S21 in FIG. 12.

FIG. 15 is a flowchart showing the details of the process of S21 shown in FIG. 12. According to this flowchart, the submappings at the m-th level are determined for a certain predetermined $\eta$. In this base technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}(\lambda=0)$. In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}$ ($\lambda=\Delta\lambda$) relative to the new $\lambda$ is obtained. This process is repeated while obtaining $f^{(m,s)}(\lambda=i\Delta\lambda)$ (i=0, 1, . . .). When $\lambda$ exceeds $\lambda_{max}$, the process proceeds to S214 and the optimal $\lambda=\lambda_{opt}$ is determined , so as to let $f^{(n)}(\lambda=\lambda_{opt})$ be the final mapping $f^{(m,s)}$ (S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
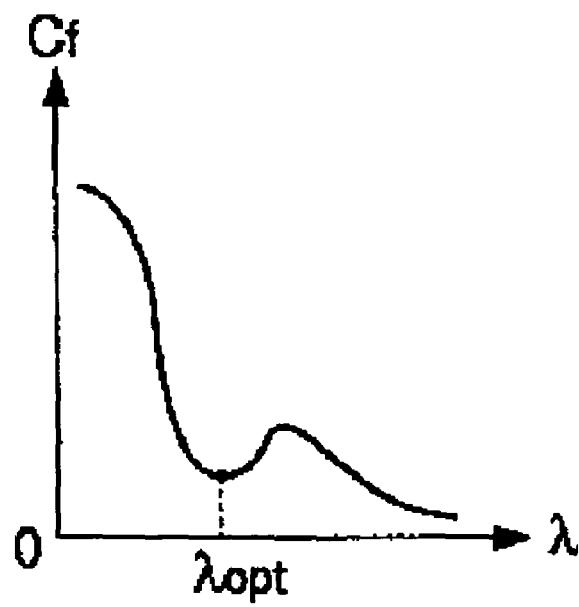
FIG. 16 is a graph showing the behavior of energy $C_f^{(m,s)}$ corresponding to $f^{(m,s)}$ ($\lambda = i\Delta\lambda$) which has been obtained for a certain $f^{(m,s)}$ while varying $\lambda$.

FIG. 16 shows the behavior of the energy $C_f^{(m,s)}$ corresponding to $f^{(m,s)}(\lambda=i\Delta\lambda)(i=0,1, . . .)$ for a certain m and s while varying $\lambda$. As described in [1.4], as $\lambda$ increases, $C_f^{(m,s)}$ normally decreases but changes to increase after $\lambda$ exceeds the optimal value. In this base technology, $\lambda$ in which $C_f^{(m,s)}$ becomes the minima is defined as $\lambda_{opt}$. As observed in FIG. 16, even if $C_f^{(m,s)}$ begins to decrease again in the range $\lambda>\lambda_{opt}$, the mapping will not be as good. For this reason, it suffices to pay attention to the first occurring minima value. In this base technology, $\lambda_{opt}$ is independently determined for each submapping including $f^{(n)}$.

Figure 17:
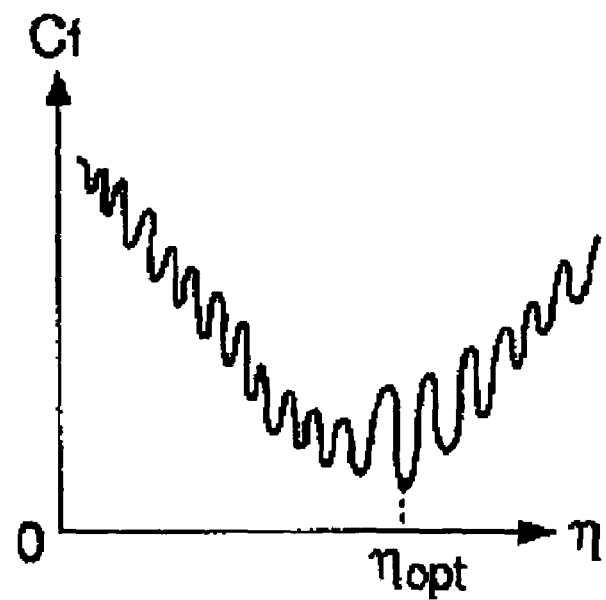
FIG. 17 is a diagram showing the behavior of energy $C_f^{(n)}$ corresponding to $f^{(n)}$ ($\eta = i\Delta\eta$)(i=0,1, . . . ) which has been obtained while varying $\eta$.

FIG. 17 shows the behavior of the energy $C_f^{(n)}$ corresponding to $f^{(n)}(\eta=i\Delta\eta)(i=0,1,)$ while varying $\eta$. Here too, $C_f^{(n)}$ normally decreases as $\eta$ increases, but $C_f^{(n)}$ changes to increase after $\eta$ exceeds the optimal value. Thus, $\eta$ in which $C_f^{(n)}$ becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:
(1) Parameters are automatically determined when the matching is computed between the source and destination hierarchical images in the base technology. This method can be applied not only to the calculation of the matching between the hierarchical images but also to computing the, matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the base technology, or more than two parameters. When there are more than three parameters used, they may be determined while changing one at a time.

(2) In the base technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0+\beta E_1$, for example, may be used as the combined evaluation equation, where $\alpha+\beta=1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be 1/9 as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

[3] Improvements in the Base Technology

The base technology above may also be further refined or improved to yield more precise matching. Some improvements are hereinafter described.

[3.1] Critical Point Filters and Subimages Considering Color Information

The critical point filters of the base technology may be revised to make effective use of the color information in the images. First, a color space is introduced using HIS (hue, intensity, saturation), which is considered to be closest to human intuition. Further, a formula for intensity which is considered closest to human visual sensitivity is used for the transformation of color into intensity.

$$H = \frac{\frac{\pi}{2} - \tan^{-1}\left(\frac{2R-G-R}{\sqrt{3}(G-B)}\right)}{2\pi} \quad (53)$$

$$I = \frac{R+G+B}{3}$$

$$S = 1 - \frac{\min(R,G,B)}{3}$$

$$Y = 0.299 \times R + 0.587 \times G + 0.114 \times B$$

Here, the following definitions are made, in which the intensity Y and the saturation S at a pixel "a" are respectively denoted by Y(a) and S(a).

$$\alpha_Y(a,b) = \begin{cases} a \cdots (Y(a) \leq Y(b)) \\ b \cdots (Y(a) > Y(b)) \end{cases} \quad (54)$$

$$\beta_Y(a,b) = \begin{cases} a \cdots (Y(a) \geq Y(b)) \\ b \cdots (Y(a) < Y(b)) \end{cases}$$

$$\beta_S(a,b) = \begin{cases} a \cdots (S(a) \geq S(b)) \\ b \cdots (S(a) < S(b)) \end{cases}$$

The following five filters are then prepared based on the definition described above.

$$p_{(i,j)}^{(m,0)} = \beta_Y(\beta_Y(p_{(2i,2j)}^{(m+1,0)}, p_{(2i,2j+1)}^{(m+1,0)}),$$
$$\beta_Y(p_{(2i+1,2j)}^{(m+1,0)}, p_{(2i+1,2j+1)}^{(m+1,0)}))$$

$$p_{(i,j)}^{(m,1)} = \alpha_Y(\beta_Y(p_{(2i,2j)}^{(m+1,1)}, p_{(2i,2j+1)}^{(m+1,1)}),$$
$$\beta_Y(p_{(2i+1,2j)}^{(m+1,1)}, p_{(2i+1,2j+1)}^{(m+1,1)}))$$

$$p_{(i,j)}^{(m,2)} = \beta_Y(\alpha_Y(p_{(2i,2j)}^{(m+1,2)}, p_{(2i,2j+1)}^{(M+1,2)}),$$
$$\alpha_Y(p_{(2i+1,2j+1)}^{(m+1,2)}))$$

$$p_{(i,j)}^{(m,3)} = \alpha_Y(\alpha_Y(p_{(2i,2j)}^{(m+1,3)}, p_{(2i,2j+1)}^{(m+1,3)}),$$
$$\alpha_Y(p_{(2i+1,2j)}^{(m+1,3)}, p_{(2i+1,2j+1)}^{(m+1,3)}))$$

$$p_{(i,j)}^{(m,4)} = \beta_S(\beta_S(p_{(2i,2j)}^{(m+1,4)}, p_{(2i,2j+1)}^{(m+1,4)}),$$
$$\beta_S(p_{(2i+1,2j)}^{(m+1,4)}, p_{(2i+1,2j+1)}^{(m+1,4)})) \quad (55)$$

The top four filters in (55) are almost the same as those in the base technology, and accordingly, critical points of intensity are preserved with color information. The last filter preserves critical points of saturation, also together with the color information.

At each level of resolution, five types of subimage are generated by these filters. Note that the subimages at the highest level are consistent with the original image.

$$p_{(i,j)}^{(n,0)} = p_{(i,j)}^{(n,1)} = p_{(i,j)}^{(n,2)} = p_{(i,j)}^{(n,3)} = p_{(i,j)}^{(n,4)} = p_{(i,j)} \quad (56)$$

[3.2] Edge Images and Subimages

An edge detection filter using the first order derivative is introduced to incorporate information related to intensity derivation (edge) for matching. This filter can be obtained by convolution integral with a given operator H.

$$p_{(i,j)}^{(n,h)} = Y(p_{(i,j)}) \otimes H_h$$

$$p_{(i,j)}^{(n,v)} = Y(p_{(i,j)}) \otimes H_v \qquad (57)$$

In this improved technology, the operator H is described, in consideration of the computing speed, as follows:

$$H_h = \frac{1}{4}\begin{bmatrix} 1 & 0 & -1 \\ 2 & 0 & -2 \\ 1 & 0 & -1 \end{bmatrix} \qquad (58)$$

$$H_v = \frac{1}{4}\begin{bmatrix} 1 & 2 & 1 \\ 0 & 0 & 0 \\ -1 & -2 & -1 \end{bmatrix}$$

Next, the image is transformed into the multiresolution hierarchy. Because the image generated by the edge detection filter has an intensity with a center value of 0, the most suitable subimages are the mean value images as follows:

$$p_{(i,j)}^{(m,h)} = \frac{1}{4}\left(p_{(2i,2j)}^{(m+1,h)} + p_{(2i,2j+1)}^{(m+1,h)} + p_{(2i+1,2j)}^{(m+1,h)} + p_{2i+1,2j+1}\right) \qquad (59)$$

$$p_{(i,j)}^{(m,v)} = \frac{1}{4}\left(p_{(2i,2j)}^{(m+1,v)} + p_{(2i,2j+1)}^{(m+1,v)} + p_{(2i+1,2j)}^{(m+1,v)} + p_{(2i+1,2j+1)}^{(m+1,v)}\right)$$

The images described in equation (59) are introduced to the energy function for computation during the "forward stage", that is, the stage in which an initial submapping is derived, as will hereinafter be described in more detail.

The magnitude of the edge, i.e., the absolute value is also necessary for the calculation.

$$p_{(i,j)}^{(n,e)} = \sqrt{(p_{(i,j)}^{(n,h)})^2 + (p_{(i,j)}^{(n,v)})^2} \qquad (60)$$

Because this value will always be positive, a maximum value filter can be used for the transformation into the multiresolutional hierarchy.

$$p_{(i,j)}^{(m,e)} = \beta_Y(\beta_Y(p_{(2i,2j)}^{(m+1,e)}, p_{(2i,2j+1)}^{(m+1,e)}), \beta_Y(p_{(2i+1,2j)}^{(m+1,e)}, p_{(2i+1,2j+1)}^{(m+1,e)})) \qquad (61)$$

The image described in equation (61) is introduced in the course of determining the order of the calculation in the "forward stage" described below.

[3.3] Computing Procedures

Figure 18:
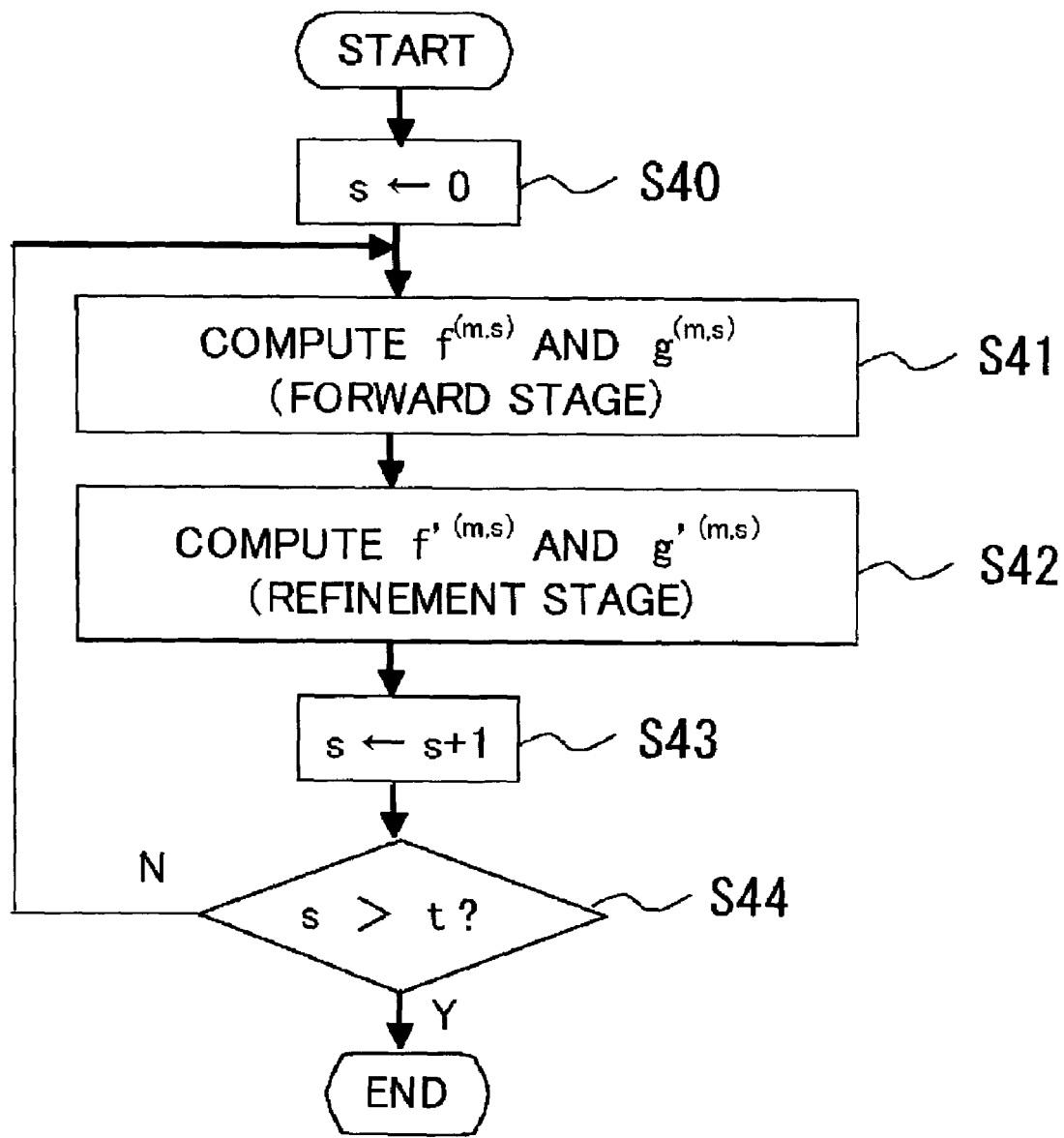
FIG. 18 is a flowchart showing a procedure by which a submapping is obtained at the m-th level in an extended base technology.

The computing proceeds in order from the subimages with the coarsest resolution. The calculations are performed more than once at each level of the resolution due to the five types of subimages. This is referred to as a "turn", and the maximum number of turns is denoted by t. Each turn includes energy minimization calculations both in a "forward stage" mentioned above, and in a "refinement stage", that is, a stage in which the submapping is recomputed based on the result of the forward stage. FIG. 18 shows a flowchart related to the improved technology illustrating the computation of the submapping at the m-th level.

As shown in the figure, s is set to zero (S40) initially. Then the mapping $f^{(m,s)}$ of the source image to the destination image is computed by energy minimization in the forward stage (S41). The energy minimized here is the linear sum of the energy C, concerning the value of the corresponding pixels, and the energy D, concerning the smoothness of the mapping.

In this improved technology, the energy C includes the energy $C_I$ concerning the intensity difference, which is the same as the energy C in the base technology described in sections [1] and [2] above, the energy $C_C$ concerning the hue and the saturation, and the energy $C_E$ concerning the difference of the intensity derivation (edge). These energies are described as follows:

$$C_I^f(i, j) = |Y(p_{(i,j)}^{(m,\sigma(t))}) - Y(q_{f(i,j)}^{(m,\sigma(t))})|^2 \qquad (62)$$

$$C_C^f(i, j) = |S(p_{(i,j)}^{(m,\sigma(t))})\cos(2\pi H(p_{(i,j)}^{(m,\sigma(t))})) -$$

$$S(q_{f(i,j)}^{(m,\sigma(t))})\cos(2\pi H(q_{f(i,j)}^{(m,\sigma(t))}))|^2 +$$

$$|S(p_{(i,j)}^{(m,\sigma(t))})\sin(2\pi H(p_{(i,j)}^{(m,\sigma(t))})) -$$

$$S(q_{f(i,j)}^{(m,\sigma(t))})\cos(2\pi H(q_{f(i,j)}^{(m,\sigma(t))}))|^2$$

$$C_E^f(i, j) = |p_{(i,j)}^{(m,h)} - q_{f(i,j)}^{(m,h)}|^2 + |p_{(i,j)}^{(m,v)} - q_{f(i,j)}^{(m,v)}|^2$$

The energy D is similar to that in the base technology described above. However, in the base technology, only the adjacent pixels are taken into account when the energy $E_1$, which deals with the smoothness of the images, is derived, whereas, in this improved technology, the number of ambient pixels taken into account can be set as a parameter d.

$$E_0^f(i, j) = \|f(i, j) - (i, j)\|^2 \qquad (63)$$

$$E_1^f(i, j) = \sum_{i'=i-d}^{i+d} \sum_{j'=j-d}^{j+d} \|(f(i, j) - (i, j)) - (f(i', j') - (i', j'))\|^2$$

In preparation for the refinement stage, the mapping $g^{(m,s)}$ of the destination image q to the source image p is also computed in the forward stage.

In the refinement stage (S42), a more appropriate mapping $f'^{(m,s)}$ is computed based on the bidirectional mappings, $f^{(m,s)}$ and $g^{(m,s)}$, which were previously computed in the forward stage. In this refinement stage, an energy minimization calculation for an energy M is performed. The energy M includes a measurement of the degree of conformation to the mapping g of the destination image to the source image, $M_0$, and the difference from the initial mapping, $M_1$.

$$M_0^{f'}(i,j) = \|g(f'(i,j)) - (i,j)\|^2$$

$$M_1^{f'}(i,j) = \|f'(i,j) - f(i,j)\|^2 \qquad (64)$$

The mapping $g'^{(m,s)}$ of the destination image q to the source image p is also computed in the same manner, in order to maintain the symmetry.

Thereafter, s is incremented (S43), and if s does not exceed t (S44), the computation proceeds to the forward stage in the next turn (S41). In so doing, the energy minimization calculation is performed using a substituted $E_0$, which is described as follows:

$$E_0^{f'}(i,j) = \|f(i,j) - f'(i,j)\|^2 \qquad (65)$$

[3.4] Order of Mapping Calculation

Because the energy concerning the mapping smoothness, $E_1$, is computed using the mappings of the ambient points, the energy depends on whether those points are previously computed or not. Therefore, the total mapping preciseness significantly depends on the point from which the computing starts and the order in which points are processed. In order to overcome this concern, an image having an absolute value of edge (see equation (61)) is introduced. Because the edge generally has a large amount of information, the mapping calculation proceeds from a point at which the absolute value of edge is the largest.

Generally, the improved technique described in this section [3] can make the mapping extremely precise, in particular, for binary images and the like.

Preferred Embodiments for Image Coding and Decoding

Image processing techniques utilizing the above-described base technology will now be described. In the base technology, when a first image and a second image (which serve as key frames) are analyzed in a multiresolutional manner so as to generate corresponding point data therebetween, the matching computation makes use of each multiresolution level from coarsest to finest. However, in the following embodiments, matching begins at the coarsest resolution but does not necessarily proceed to the finest or most detailed resolution (referred to as "final resolution" hereinafter). In particular, the matching computation may be stopped at some point in the resolution hierarchy. As an example, a reason for stopping the matching computation may relate to reducing computational complexity and computation time. Using an example from the base technology, since the number of pixels increases by a factor of four every time the resolution proceeds by one level in the resolution hierarchy, the amount of computational analysis will increase by a factor of at least four. Now, supposing that the computational amount is "1" at the coarsest resolution (that is, the resolution at the outset of the matching). Then, the computational amount will be 1, 4, 16, 64, . . . , as the process proceeds through the hierarchy toward the finest or final resolution. Thus, by simply skipping the matching computation at the final resolution the amount of computation can be reduced to ⅕–¼ of the original amount of computation required. Moreover, skipping the matching computation for the final resolution as well as the resolution immediately prior to the final resolution (referred to as the "second finest resolution") can reduce the computation amount to approximately 1/20. According to the following embodiments, this skipping of the matching computation for predetermined resolution levels is performed in order to reduce the time required for coding. This skipping of the matching computation for predetermined resolution levels will sometimes be simply called a skip, hereinafter. Although the resolution levels to be skipped can be determined according to various parameters, including the relevant application, the following examples focus on cases in which only the final resolution is skipped.

Since the matching computation at the final resolution is skipped, a matching result at the final resolution will not be obtained. As such, there will only be a matching result at the second finest resolution. This matching result represents corresponding point data between the key frames at the second finest level of resolution, which is hereinafter referred to as "interim corresponding point data". It is to be noted here that the notional matching result at the final resolution will be referred to as "final corresponding point data" hereinafter. Further, when the phrase "corresponding point data" is used, it generally means this final corresponding point data. Generally, there are a variety of ways to deal with the reduction in data caused by a skip, and the following three methods (1)–(3) are considered as examples:

(1) The matching computation for the final resolution level is replaced by a simplified method in which refinement is achieved by projecting the interim corresponding point data onto an image of the final resolution, so as to generate final corresponding point data.
(2) The interim corresponding point data are output, as they are.
(3) The matching computation for the final resolution level is replaced by a simplified method in which block matching is performed and then the final corresponding point data are acquired based on the interim corresponding point data.

Figure 19:
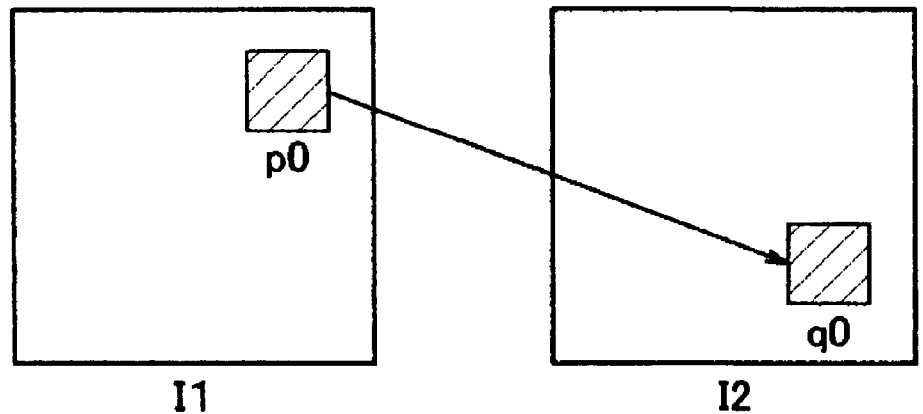
FIG. 19 illustrates how pixels correspond between a first image I1 and a second image I2 at a second-finest resolution.
Figure 20:
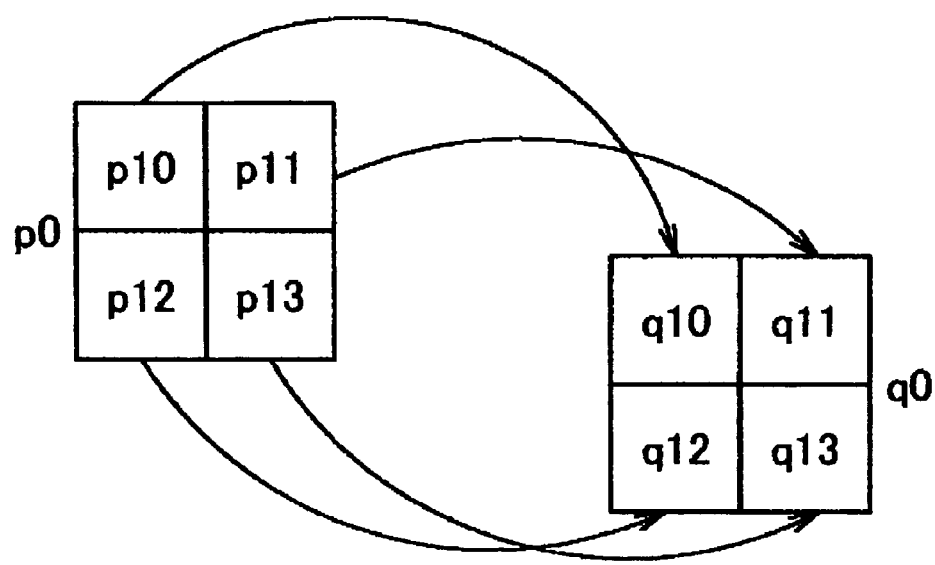
FIG. 20 illustrates how the correspondence shown in FIG. 19 is projected onto images at the final resolution.

FIGS. 19 and 20 illustrate the concepts of method (1). Referring to FIG. 19, a pixel p0 of a first image I1 corresponds to a pixel q0 of a second image I2 at the second finest resolution. Now, FIG. 20 illustrates the pixel p0 of the first image I1 and the pixel q of the second image I2 at the final resolution. If we suppose that these pixels correspond to each other even at the final resolution, in other words, suppose that the interim corresponding point data can be projected directly onto the final resolution level, the four final resolution pixels p10, p11, p12 and p13 which make up the pixel p0 can be supposed to correspond to the four pixels q10, q11, q12 and q13 which makeup the pixel q0. In other words, the final corresponding point data can be refined or determined, from the interim corresponding point data, as (p10, q10), (p11, q11), (p12, q12) and (p13, q13). A similar refinement by projection and translation can be performed for the other pixels in the second finest resolution, so that a version of final corresponding point data can be incorporated into coded data. It will be understood that the method (1) provides a simpler and easier computation for the final corresponding point data.

In the case of method (2), the interim corresponding point data are simply incorporated into the coded data and output. In this method, it is preferred that information regarding the resolution level at which the matching processing was stopped (referred to as a "truncated resolution level" or "aborted resolution level" hereinafter) is added to the coded data. This is preferred because, if the truncated resolution level is known, corresponding point data can be generated, possibly in an approximate or simplified manner, at a decoding side, for example, by a method similar to method (1) above or (3) below. In other words, the coded data can be completed at the decoding side.

Moreover, if information regarding the truncated resolution level are always included, even in the case of method (1), the decoding side can determine which of methods (1) and (2) was performed at the coding side. Of course, if method (1) was used, the "truncated resolution level" will equal the "final resolution".

Still further, in the case of method (2), if the truncated resolution level is available, the number of pixels at the final corresponding point data that correspond to a given pixel at the truncated resolution level can be verified, and a proper processing can be performed.

Figure 21:
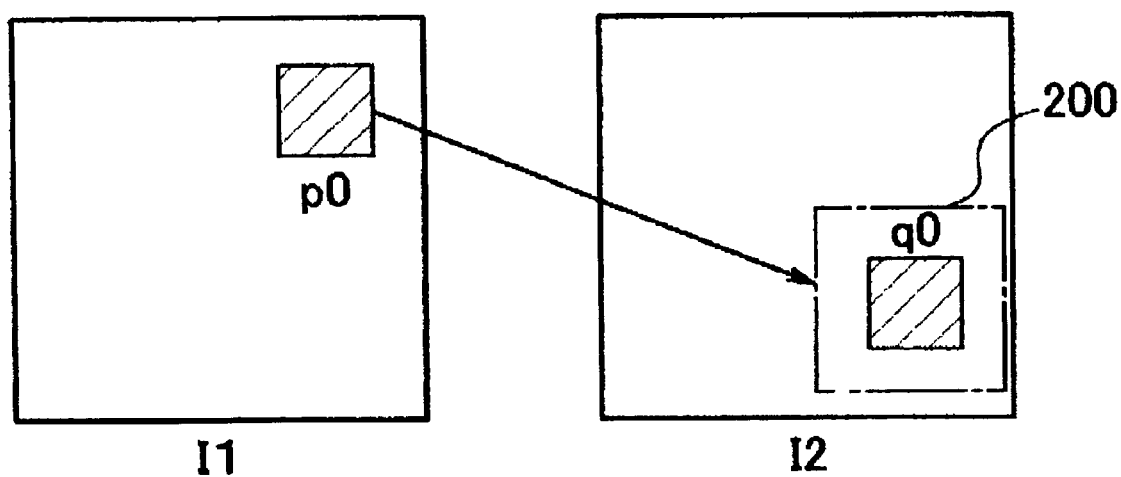
FIG. 21 illustrates how final corresponding point data are obtained using block matching.

FIG. 21 illustrates the concept of method (3). Although method (3) requires a more computation than method (1), the accuracy of the final corresponding point data may be higher. As such, method (3) may serve as an optional method. In method (3), we begin with the same supposition as in FIG. 19, however, as shown in FIG. 21, block matching is performed based on the interim corresponding point data in order to acquire the final corresponding point data. In particular, block matching is performed at the final resolution level using a block that is the pixel p0 of the first image I1 in the second finest resolution level. This pixel p0 is moved, in a predetermined range 200, around the pixel q0 in the second image I2 obtained based on the interim corresponding point data, and the position at which accumulated difference values for the respective four pixels making up the pixel p0 become minimum are regarded as the corresponding position, so that the final corresponding point data are determined. In order to calculate the accumulated difference values, various methods may be used such as, for example, summation of absolute value of a difference of each pixel, sum of squares thereof and so forth.

It will be understood that the processing for method (3) is not necessarily performed at the coding side and may be performed at a decoding side in the case where method (2) or the like is applied at the coding side.

In this method (3), it is noted that a single pixel at the truncated resolution level does not necessarily have to serve as a unit for the block. The size of the block may be determined as appropriate.

If the processing at the coding side may include method (3), if may be preferable that a description as to which of methods (1), (2) and (3) has been performed be incorporated into the coded data sequence. However, since final corresponding point data are obtained in both methods (1) and (3), even though the methods implemented are different, each of these methods (1) and (3) can be handled appropriately at the decoding side as long as they are distinguished from method (2). As described above, if there is an indication as to the truncated resolution level, it will generally be sufficient for processing at the decoding side.

Figure 22:
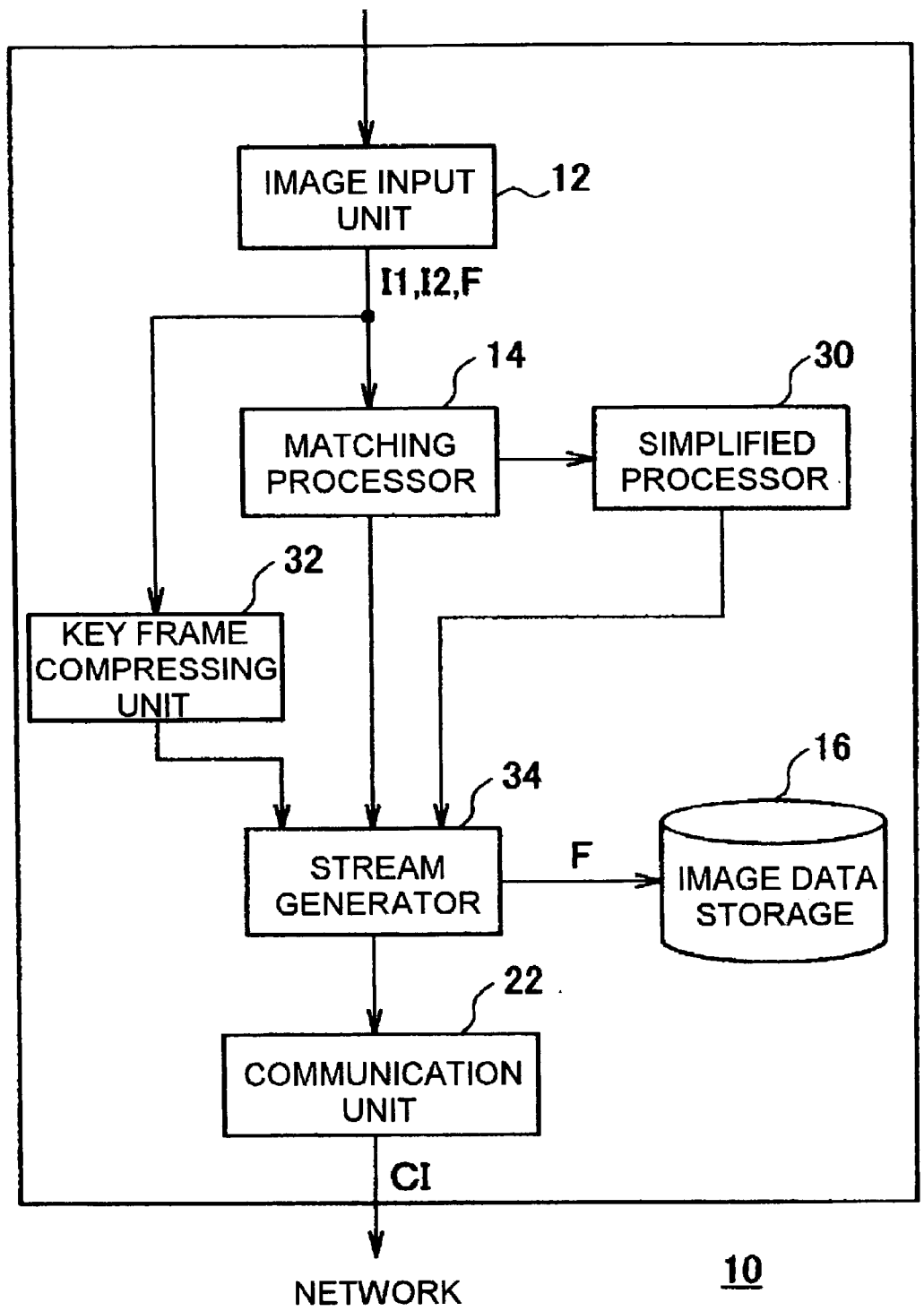
FIG. 22 is a block diagram showing an image coding apparatus according to an embodiment of the invention.

FIG. 22 shows an image coding apparatus 10 according to an embodiment of the present invention. The image coding apparatus 10 includes: an image input unit 12 which acquires key frames, including a first image I1 and a second image I2, from an external source such as a storage device (not shown), a photographing camera (not shown) or the like; a matching processor 14 which performs a matching computation on the acquired images by utilizing the base technology or other techniques; a simplified processing unit 30 which generates final corresponding point data by a simplified method when a matching computation by the matching processor is aborted or truncated; a key frame compressing unit 32 which compresses the first image I1, second image I2 and other key frames in an intra-frame format; and a stream generator 34 which generates a coded data stream CI (hereinafter simply referred to as a coded stream) from the compressed key frames, final corresponding point data or interim corresponding point data from the matching processor 14, if any, and final corresponding point data, if any, by the simplified processing unit 30. The corresponding point data are included in a "corresponding point file F". The coded data stream CI, generally including the corresponding point file F, may be stored in an image data storage unit 16, as needed, or may be output to a network, external storage device or the like via a communication unit 22.

In this embodiment, the matching processor 14 may generally detect corresponding points between the first image I1 and the second image I2 by utilizing the base technology. However, if computation time and computation load therefor are or are expected to be long and large, the matching computation may be dynamically skipped during the processing. In this case, the interim corresponding point data may be sent to the simplified processing unit 30 where the final corresponding point data are generated using, for example, method (1) or (3) described above. It is noted that the processing to be performed by the simplified processing unit 30 may be performed at a decoding side as described below. Also, the simplified processing unit 30 may alternatively perform other appropriate simplified processing methods.

A key frame compressing unit 32 intra-frame compresses key frames according to JPEG or other appropriate methods, generally, while the matching processor 14 and/or simplified processor 30 are operating.

If the matching computation is skipped, the stream generator 34 may acquire the truncated resolution level from the matching processor 14 and incorporate it into the coded stream CI in addition to the above-described data. This is particularly useful if method (2) is used and the simplified processor 30 is not used such that the interim corresponding point data is included in the coded data stream CI. However, if the simplified processor 30 generates the final corresponding point data and recovers the skipped processing, the truncated resolution level generally does not need to be incorporated.

Figure 23:
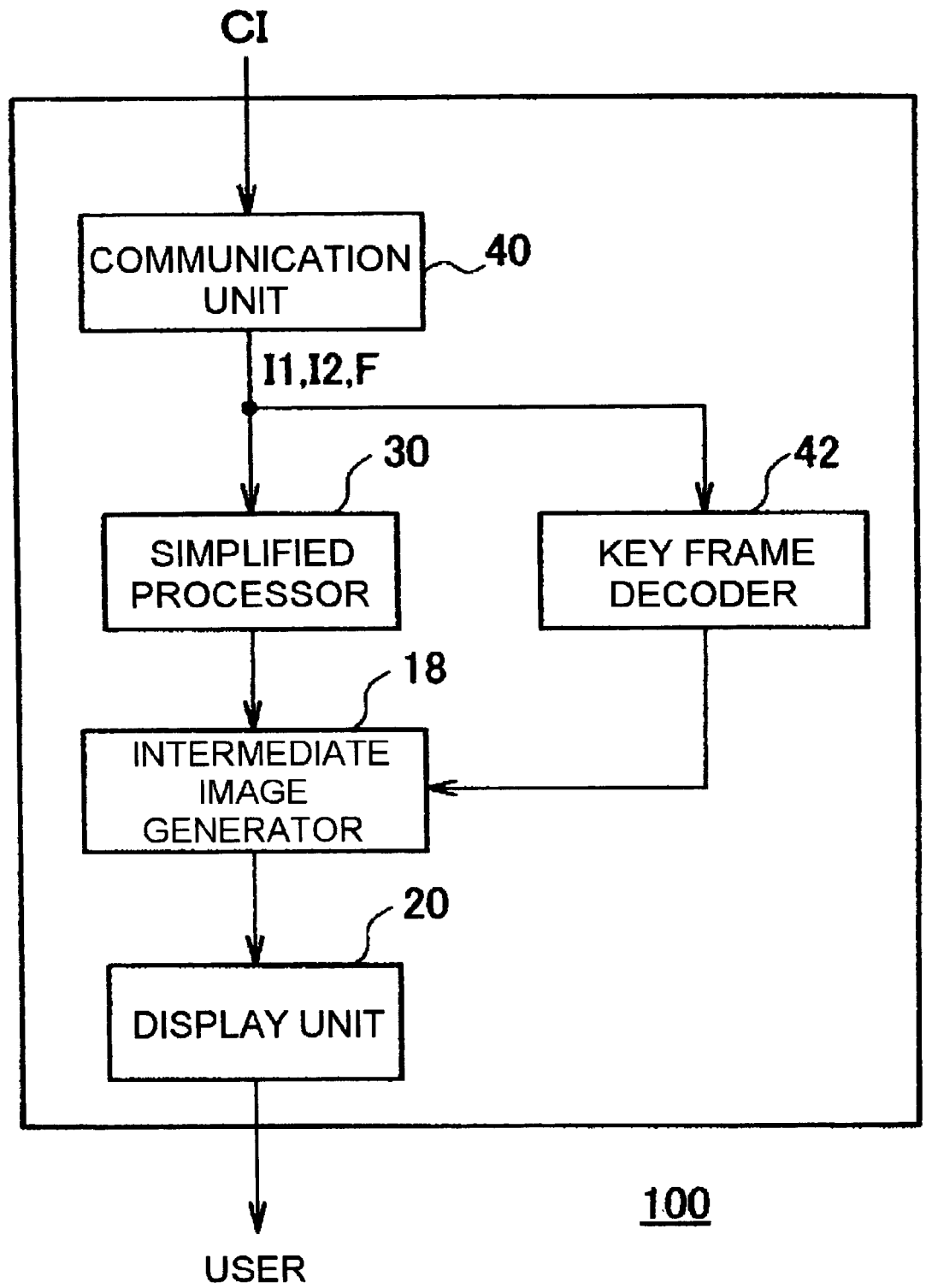
FIG. 23 is a block diagram showing an image decoding apparatus according to an embodiment of the invention.

On the decoding side, FIG. 23 shows an image decoding apparatus 100 which receives the generated coded stream CI and reproduces moving images therefrom. In the image decoding apparatus 100, a communication unit 40 acquires the coded stream CI via a network, from external storage, or the like and sends the coded stream CI to a simplified processor 30 and a key frame decoder 42. If there has been a skip at the coding side, the simplified processor 30 detects information on the truncated resolution level from the coded stream CI and generates the final corresponding point data based on methods (1) or (3) or the like. However, in a case when the final corresponding point data have already been generated at the coding side, the simplified processor 30 will merely pass the coded data stream CI through, that is, no processing will be performed. After leaving the simplified processor 30, the coded data stream CI passes to an intermediate image generator 18.

The key frame decoder 42 decodes the compressed key frames, which, in the present example, are the first image I1 and the second image I2, and sends these images to the intermediate image generator 18. It will be understood that, there may be a plurality of images (key frames) and the decoding of the key frames may be performed in a continuous manner, such that, reproduction of moving images over a longer period of time becomes possible.

The intermediate image generator 18 generates intermediate frames between key frames by interpolating positions and pixel values between corresponding points in the key frames, as described in the base technology. In the present example, the intermediate frames are generated based on the decoded first image I1, decoded second image I2 and the final corresponding point data. The key frames and the intermediate frames are output in order such that moving images are output to a display unit 20 and the decoding or reproduction processing is completed.

It will be understood that various modifications may be made to the above embodiments by one of skill in the art. Several examples of such modifications are now described.

Although coding and decoding of moving pictures are considered in the present embodiments, the interpolation may not necessarily be of a temporal nature (i.e. related to time). It is also possible to use multiple images from different viewpoints and interpolate spatially to provide a 3D view, walk-through view or the like.

In a particular case, the image coding apparatus 10 may be arranged such that the matching processor 14 performs the skip processing when a predetermined time limit or truncated resolution level is reached rather than based on computation time or amount. For example, when the moving images are taken by a television camera or the like, the coding may need to be completed in real time or within a time period close to real time. In this case, there is a practical consideration in determining dynamically as to whether or not a skip is to be adopted.

Similarly in the image decoding apparatus 100, the simplified processor 30 may be set to perform method (3) as a default but may change to method (1) if a time limit or some other threshold is reached. Since the decoding side must be designed to provide users with the best quality moving images for their systems, this consideration has a practical impact in terms of product design.

Although the present invention has been described by way of exemplary embodiments, it should be understood that many changes and substitutions may be made by those skilled in the art without departing from the scope of the present invention which is defined by the appended claims.

What is claimed is:

1. An image coding apparatus configured to analyze images, said images comprising a first image and a second image, in a multiresolutional manner, characterized in that:
   the analyzing images in a multiresolutional manner comprises a plurality of stages corresponding to a plurality of resolutions, said plurality of stages comprising at least a first stage and a final stage, and wherein said analyzing comprises at least a standard method and a simplified method; and
   the analyzing is switched to the simplified method at a stage prior to the final stage;
   the image coding apparatus comprising;
   a matching processor which generates corresponding point data based on said analysis of said first image and second image in a multiresolutional manner; and
   a stream generator which outputs, as coded data, the corresponding point data generated by said matching processor;
   wherein said matching processor switches the analyzing to the simplified method at a stage prior to reaching a final resolution of the first and second images, and corresponding point data that have been generated prior to switching to the simplified method are output on the assumption that the simplified method is to be executed at a decoding side.

2. An image coding apparatus according to claim 1, wherein the simplified method comprises projecting corresponding point data of the first and second images at non-final resolution onto the first and second images at final resolution.

3. An image coding apparatus according to claim 1, further comprising:
   a key frame compressing unit which compresses the first and second images respectively in an intra-frame format,
   wherein compressed data from said key frame compressing unit are output in a manner that the compressed data are incorporated into the coded data.

4. An image coding apparatus according to claim 1, wherein the simplified method comprises acquiring corresponding point data at a final resolution by performing block matching based on corresponding point data of the first and second images at a non-final resolution.

5. A computer readable storage medium having stored thereon a computer program for image coding, which when executed by a computer, causes the computer to perform the functions of:
   preparing a multiresolutional image for a first image and a second image;
   conducting analysis on the multiresolutional image, wherein the analysis comprises a plurality of stages corresponding to a plurality of resolutions, said plurality of stages comprising at least a first stage and a final stage and wherein said analysis comprises at least a standard method and a simplified method; and
   switching the analysis to the simplified method at a stage prior to the final stage;
   generating corresponding point data based on said analysis of said first image and second image in a multiresolutional manner; and
   outputting the corresponding point data generated by said generating, wherein said switching the analysis comprises switching to the simplified method at a stage prior to reaching a final resolution of the first and second images, and corresponding point data that have been generated prior to switching to a simplified method are output on the assumption that the simplified method is to be executed at a decoding side.

6. An image coding method, comprising:
   analyzing a first image and a second image in a multiresolutional manner, wherein said multiresolutional manner comprises a plurality of stages corresponding to a plurality of resolutions, said plurality of stages comprising at least a first stage and a final stage and wherein said analyzing comprises at least a standard method and a simplified method;
   switching the analysis to the simplified method at a stage prior to the final stage;
   generating corresponding point data based on said analysis of said first image and second image in a multiresolutional manner; and
   outputting the corresponding point data generated by said generating, wherein said switching the analysis comprises switching to the simplified method at a stage prior to reaching a final resolution of the first and second images, and corresponding point data that have been generated prior to switching to a simplified method are output on the assumption that the simplified method is to be executed at a decoding side.

7. An image coding method according to claim 6, wherein said plurality of resolutions comprises a multiresolutional image hierarchy and said analyzing comprises conducting analysis on the multiresolutional image hierarchy.

8. An image coding method according to claim 6, wherein the simplified method comprises projecting corresponding point data of the first and second images at non-final resolution onto the first and second images at final resolution.

9. An image coding method according to claim 6, further comprising:
   compressing the first and second images respectively in an intra-frame format; and
   outputting compressed data obtained by said compressing together with the corresponding point data.

10. image coding method according to claim 1, wherein the simplified method comprises acquiring corresponding point data at a final resolution by performing block matching based on corresponding point data of the first and second images at a non-final resolution.

11. An image coding method, comprising:
    analyzing an image in a multiresolutional manner, wherein said multiresolutional manner comprises a plurality of stages corresponding to a plurality of resolutions, said plurality of stages comprising at least a first stage and a final stage and wherein said analyzing comprises at least a standard method and a simplified method;

switching the analysis to the simplified method at a stage prior to the final stage;

generating analysis data based on said analysis in a multiresolutional manner; and outputting the analysis data generated by said generating;

wherein the analysis data that have been generated prior to switching to a simplified method are output on the assumption that the simplified method is to be executed at a decoding side.

* * * * *